United States Patent [19]
Tanaka et al.

[11] Patent Number: 5,695,260
[45] Date of Patent: Dec. 9, 1997

[54] CONTROL APPARATUS FOR DETECTING MALFUNCTIONING OF PRESSURE SENSORS IN AN AUTOMOTIVE FLUID PRESSURE CIRCUIT

[75] Inventors: Hirohisa Tanaka; Masato Yoshino, both of Itami, Japan

[73] Assignee: Sumitomo Electric Industries, Ltd., Osaka, Japan

[21] Appl. No.: 565,820

[22] Filed: Dec. 1, 1995

[30] Foreign Application Priority Data

Dec. 8, 1994 [JP] Japan ................................ 6-304714

[51] Int. Cl.⁶ .................................................. B60T 13/12
[52] U.S. Cl. ................... 303/122.12; 303/3; 303/122.13; 303/113.1; 303/11
[58] Field of Search ............................ 303/10, 11, 113.1, 303/116.4, DIG. 1, DIG. 2, DIG. 3, 122.13, 122.14, 122.15, 122.12

[56] References Cited

U.S. PATENT DOCUMENTS

| | | | |
|---|---|---|---|
| 4,699,435 | 10/1987 | Wupper | 303/11 |
| 4,848,847 | 7/1989 | Reinartz et al. | 303/11 |
| 5,000,520 | 3/1991 | Schmitt | 303/DIG. 3 |
| 5,375,506 | 12/1994 | Hashida et al. | 91/446 |

FOREIGN PATENT DOCUMENTS

| | | | |
|---|---|---|---|
| 3266756 | 11/1991 | Japan . | |
| 4238770 | 8/1992 | Japan . | |
| 2245038 | 12/1991 | United Kingdom | 303/122.12 |

*Primary Examiner*—Matthew C. Graham
*Attorney, Agent, or Firm*—Greenblum & Bernstein P.L.C.

[57] ABSTRACT

A control apparatus is provided for a fluid pressure circuit in a motor vehicle. The control apparatus may include a first fluid pressure detector that detects a fluid pressure in an accumulator, and that switches between two states when the detected fluid pressure reaches a first fluid pressure setting P1. A second fluid pressure detector may also be provided that switches between two states when the detected fluid pressure reaches a second fluid pressure setting P2 that is lower than the first fluid pressure setting P1. The control apparatus may also include a timer that counts the period during which the fluid pressure detected by the second fluid pressure detector is less than the second fluid pressure setting P2, and a trouble evaluation system that evaluates whether there is a problem in the first or second fluid pressure detector by determining whether the first and second fluid pressure detectors are indicating different states, and whether the period detected by the timer is also equal to or greater than a predetermined value.

20 Claims, 12 Drawing Sheets

CONTROL APPARATUS FOR DETECTING MALFUNCTIONING OF PRESSURE SENSORS IN AN AUTOMOTIVE FLUID PRESSURE CIRCUIT

BACKGROUND OF THE INVENTION

1. Field of the Invention

The present invention relates to a control apparatus for an automotive fluid pressure circuit wherein a pressure switch is disposed between an accumulator and a pump of the fluid pressure circuit for the brake system, and pump operation is controlled according to the state of the pressure switch and, particularly, to detection of error operation of the pressure switch and drive control for the pump upon detecting the error operation of the same.

2. Description of the Prior Art

A fluid pressure pump has been conventionally used for accumulating the brake fluid in the brake system, and a pressure switch is used to detect the fluid pressure of the pressure supply to control the operation of the fluid pressure pump.

FIG. 14 shows an example of a pressure switch using a Bourdon tube. The operation of this pressure switch is described below.

As shown in FIG. 14, the Bourdon tube 100 is a tube curved in approximately a semicircle with one end closed and the other, open, end shaped perpendicular to the semicircle. The brake fluid enters the Bourdon tube 100 from the open end to regulate the fluid pressure. The long leg of an approximately L-shaped member 101 made from a sheet material is fixed to the closed end of the Bourdon tube 100. While the closed end of the Bourdon tube 100 is also secured by a fixed member 102, the semicircular loop of the Bourdon tube 100 is free between the ends.

As fluid pressure accumulates in the Bourdon tube 100, the semicircular Bourdon tube 100 pivots on the fixed member 102 and curves in the direction straightening the loop section; when the pressure inside the tube drops again, the loop again pivots on the fixed member 102 and resumes the semicircular shape. When the pressure inside the Bourdon tube 100 drops, the L-shaped member 101 pushes against the one end of lever 103, which pivots on stud 105. As a result, the other end 104 of lever 103 also rotates on stud 105.

When the pressure inside the Bourdon tube 100 rises and the L-shaped member 101 gradually separates from the one end of the lever 103, lever 103 is rotated on the stud 105 by the spring 106, and the other end 104 presses the button 108 of the microswitch 107. When the pressure inside the Bourdon tube 100 drops, the L-shaped member 101 presses the one end of the lever 103, which thus rotates on the stud 105, causing the other end 104 of the lever 103 to separate from the microswitch button 108.

A pressure switch as described above uses either a single switch for the microswitch 107 or a two-channel switch for detecting two pressure states (high and low). When a two-channel microswitch 107 is used, fluid pressure pump drive is normally controlled by the pressure switch that switches on the high pressure side, and the switch on the low pressure side is used to detect and report an abnormally low pressure level in the pressure supply. A problem in the fluid pressure pump or the pressure switch can be detected by the high pressure switch indicating a low pressure state, and the fluid pressure of the pressure supply not rising even if the pump is operated for a predetermined period of time.

However, with a control apparatus for an automotive fluid pressure circuit as described above, the fluid pressure pump ceases to operate when the high pressure switch becomes wrongly locked at the high pressure position. When the fluid pressure circuit is used as the fluid pressure source for an automatic brake control system or as the fluid pressure source for a fluid pressure booster and this problem develops, the fluid pressure of the pressure source drops, and satisfactory performance may not be obtained from the various functions relying on that fluid pressure source. Furthermore, when the low pressure switch becomes wrongly locked at the low pressure position, the low pressure warning is output continuously.

SUMMARY OF THE INVENTION

Therefore, an object of the present invention is to provide a control apparatus for an automotive fluid pressure circuit whereby trouble states as described above can be detected and sufficient fluid pressure can be obtained in the fluid pressure source even when a problem is present.

To achieve the above object, a control apparatus for an automotive fluid pressure circuit according to the present invention comprises a first fluid pressure detection means for detecting a fluid pressure in an accumulator, and switching between two states when the detected fluid pressure reaches a first fluid pressure setting P1; a second fluid pressure detection means for switching between two states when the detected fluid pressure reaches a second fluid pressure setting P2 that is lower than the first fluid pressure setting P1; a timer for counting the period during which the fluid pressure detected by the second fluid pressure detection means is less than the second fluid pressure setting P2; and a trouble evaluation means for evaluating whether there is a problem in the first or the second fluid pressure detection means by determining whether the first and second fluid pressure detection means are indicating different pressure levels, and whether the time of the second fluid pressure detection means detected by the timer is also equal to or greater than a predetermined value.

In a control apparatus for an automotive fluid pressure circuit according to one embodiment of the present invention, the trouble evaluation means operates a pump to pressurize the fluid pressure in the accumulator when the pressure detected by the first fluid pressure detection means is a high pressure state greater than or equal to the first fluid pressure setting P1 and the pressure detected by the second fluid pressure detection means is a low pressure state less than the second fluid pressure setting P2; and determines a problem to have developed in the second fluid pressure detection means when the time counted by the timer exceeds a predetermined count.

In a control apparatus for an automotive fluid pressure circuit according to another embodiment of the present invention, the trouble evaluation means operates a pump to pressurize the fluid pressure in the accumulator when the pressure detected by the first fluid pressure detection means is a high pressure state greater than or equal to the first fluid pressure setting P1 and the pressure detected by the second fluid pressure detection means is a low pressure state less than the second fluid pressure setting P2; and determines a problem to have developed in the first fluid pressure detection means when the pressure detected by the second fluid pressure detection means becomes a high pressure state greater than or equal to the second fluid pressure setting P2 before the timer counts a predetermined count.

In a control apparatus for an automotive fluid pressure circuit according to further embodiment of the present invention, when a problem is detected in the second fluid pressure detection means, the trouble evaluation means of claim 2 determines the second fluid pressure detection means to be locked in a low pressure error state less than the second fluid pressure setting P2, and corrects the second fluid pressure detection means to a high pressure state in which the detected pressure is greater than or equal to the second fluid pressure setting P2.

In a control apparatus for an automotive fluid pressure circuit according to further embodiment of the present invention, the trouble evaluation means cancels the error determination for the second fluid pressure detection means when the second fluid pressure detection means indicates a high pressure state greater than or equal to the second fluid pressure setting P2 after a problem is once detected in the second fluid pressure detection means.

In a control apparatus for an automotive fluid pressure circuit according to further embodiment of the present invention, the trouble evaluation means determines the first fluid pressure detection means to be locked in a high pressure error state greater than or equal to the first fluid pressure setting P1 when a problem is detected in the first fluid pressure detection means, and corrects the first fluid pressure detection means to a low pressure state in which the detected pressure is less than the first fluid pressure setting P1.

In a control apparatus for an automotive fluid pressure circuit according to further embodiment of the present invention, the trouble evaluation means cancels the error determination for the first fluid pressure detection means when the first fluid pressure detection means indicates a low pressure state less than the first fluid pressure setting P1 after a problem is once detected in the first fluid pressure detection means.

In a control apparatus for an automotive fluid pressure circuit according to further embodiment of the present invention, the trouble evaluation means determines a problem to exist in the pump for pressurizing the fluid pressure in the accumulator, and stops said pump, when the first fluid pressure detection means and the second fluid pressure detection means respectively indicate the fluid pressures detected thereby to be less than the first and second fluid pressure settings P1 and P2, and the timer count returned by the timer exceeds a predetermined count.

In a control apparatus for an automotive fluid pressure circuit according to further embodiment of the present invention, the trouble evaluation means drives said pump when the pressure detected by the first fluid pressure detection means is a low pressure state less than the first fluid pressure setting P1 and the pressure detected by the second fluid pressure detection means is a low pressure state less than the second fluid pressure setting P2; and determines a problem to exist in the pump and stops the pump when the timer count exceeds a predetermined count.

A control apparatus for an automotive fluid pressure circuit according to further embodiment of the present invention further comprises a pump drive evaluation means for evaluating whether driving the pump to pressurize the fluid pressure in the accumulator can be continued based on the problem evaluation result returned by the trouble evaluation means, and drives said pump when it is determined that pump drive is possible.

In a control apparatus for an automotive fluid pressure circuit according to further embodiment of the present invention, the trouble evaluation means is characterized by canceling the pump stop command in response to a control signal applied thereto to consume the fluid pressure in the accumulator when a pump problem is determined and the pump is being stopped, and driving the pump for as long as the control signal is applied.

Operation and effects of the invention

The control apparatus for an automotive fluid pressure circuit according to the present invention can reliably evaluate problems in the first and second fluid pressure detection means because the timer measures the period during which the pressure detected by the second fluid pressure detection means is less than the second fluid pressure setting P2, and the trouble evaluation means determines there to be a problem in either the first or the second fluid pressure detection means based on whether the first and the second fluid pressure detection means indicate different pressure states, and whether the pressure state of the second fluid pressure detection means counted by the timer exceeds a predetermined value.

The control apparatus for an automotive fluid pressure circuit according to one embodiment of the invention can reliably evaluate problems in the second fluid pressure detection means because the trouble evaluation means operates a pump to pressurize the fluid pressure in the accumulator when the pressure detected by the first fluid pressure detection means is a high pressure state greater than or equal to the first fluid pressure setting P1 and the pressure detected by the second fluid pressure detection means is a low pressure state less than the second fluid pressure setting P2; and determines a problem to have developed in the second fluid pressure detection means when the time counted by the timer exceeds a predetermined count.

The control apparatus for an automotive fluid pressure circuit according to further embodiment of the invention can reliably evaluate problems in the first fluid pressure detection means because the trouble evaluation means operates a pump to pressurize the fluid pressure in the accumulator when the pressure detected by the first fluid pressure detection means is a high pressure state greater than or equal to the first fluid pressure setting P1 and the pressure detected by the second fluid pressure detection means is a low pressure state less than the second fluid pressure setting P2; and determines a problem to have developed in the first fluid pressure detection means when the pressure detected by the second fluid pressure detection means is a high pressure state greater than or equal to the second fluid pressure setting P2 and the time counted by the timer exceeds a predetermined count.

The control apparatus for an automotive fluid pressure circuit according to further embodiment of the invention can maintain pump control and can prevent a low pressure warning from being output continuously when a problem is detected in the second fluid pressure detection means because the trouble evaluation means determines the second fluid pressure detection means to be locked in a low pressure error state less than the second fluid pressure setting P2, and therefore corrects the second fluid pressure detection means to a high pressure state in which the detected pressure is greater than or equal to the second fluid pressure setting P2.

The control apparatus for an automotive fluid pressure circuit according to further embodiment of the invention can automatically restore the fluid pressure circuit control to a normal state when the second fluid pressure detection means returns from the locked low pressure side error state to a normal state because the trouble evaluation means cancels the error determination for the second fluid pressure detection means when the second fluid pressure detection means indicates a high pressure state greater than or equal to the second fluid pressure setting P2 after a problem is once detected in the second fluid pressure detection means.

The control apparatus for an automotive fluid pressure circuit according to further embodiment of the invention can continue pump operation because the trouble evaluation means determines the first fluid pressure detection means to be locked in a high pressure error state greater than or equal to the first fluid pressure setting P1 when a problem is detected in the first fluid pressure detection means, and corrects the first fluid pressure detection means to a low pressure state in which the detected pressure is less than the first fluid pressure setting P1.

The control apparatus for an automotive fluid pressure circuit according to further embodiment of the invention can automatically restore the fluid pressure circuit control to a normal state when the first fluid pressure detection means returns from the locked high pressure side error state to a normal state because the trouble evaluation means cancels the error determination for the first fluid pressure detection means when the first fluid pressure detection means indicates a low pressure state less than the first fluid pressure setting P1 after a problem is once detected in the first fluid pressure detection means.

In the control apparatus for an automotive fluid pressure circuit according to further embodiment of the invention, the trouble evaluation means determines a problem to exist in the pump for pressurizing the fluid pressure in the accumulator, and stops said pump, when the first and the second fluid pressure detection means indicate the fluid pressures detected thereby to be less than fluid pressure settings P1 and P2, respectively, and the timer count returned by the timer exceeds a predetermined count. As a result, the control apparatus of the invention can reliably determine an inability to sustain pressure because the pump cannot store pressure in the accumulator.

In the control apparatus for an automotive fluid pressure circuit according to further embodiment of the invention, the trouble evaluation means drives said pump when the pressure states detected by the first and second fluid pressure detection means are low pressure states less than the first and second fluid pressure settings P1 and P2, respectively, and determines a problem to exist in the pump and stops the pump when the timer count exceeds a predetermined count. As a result, the control apparatus of the invention can reliably determine an inability to sustain pressure because the pump cannot store pressure in the accumulator.

The control apparatus for an automotive fluid pressure circuit according to further embodiment of the invention further comprises a pump drive evaluation means for evaluating, based on the problem evaluation result returned by the trouble evaluation means, whether driving the pump to pressurize the fluid pressure in the accumulator can be continued, and driving said pump when it is determined that pump drive is possible. As a result, the control apparatus of the invention can continue controlling the pump, if pump drive is still possible, even when a problem is detected in the first or second fluid pressure detection means.

The control apparatus for an automotive fluid pressure circuit according to further embodiment can improve the fluid pressure supply capacity when a control request to consume the accumulator fluid pressure is received because the pump drive evaluation means cancels the pump stop command and drives the pump for as long as the control signal is applied when a control signal instructing consumption of the fluid pressure in the accumulator is input when a pump problem is determined and the pump is stopped.

BRIEF DESCRIPTION OF THE DRAWINGS

The present invention will become more fully understood from the detailed description given below and the accompanying diagrams wherein.

DESCRIPTION OF PREFERRED EMBODIMENTS

Figure 1:
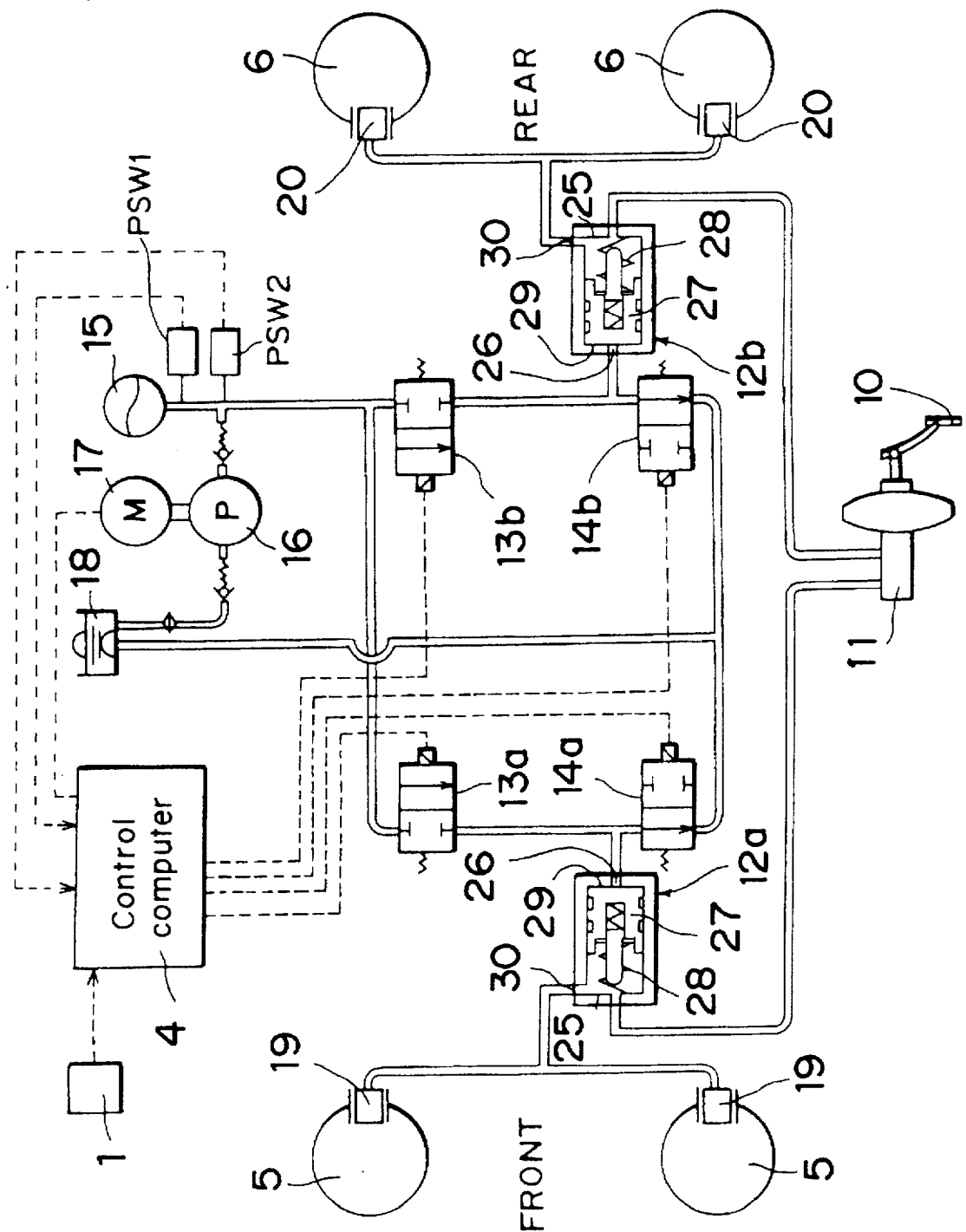
FIG. 1 is a system diagram of the control apparatus of the first embodiment of the invention adapted to a brake control system for a four wheel motor vehicle.
Figure 2:
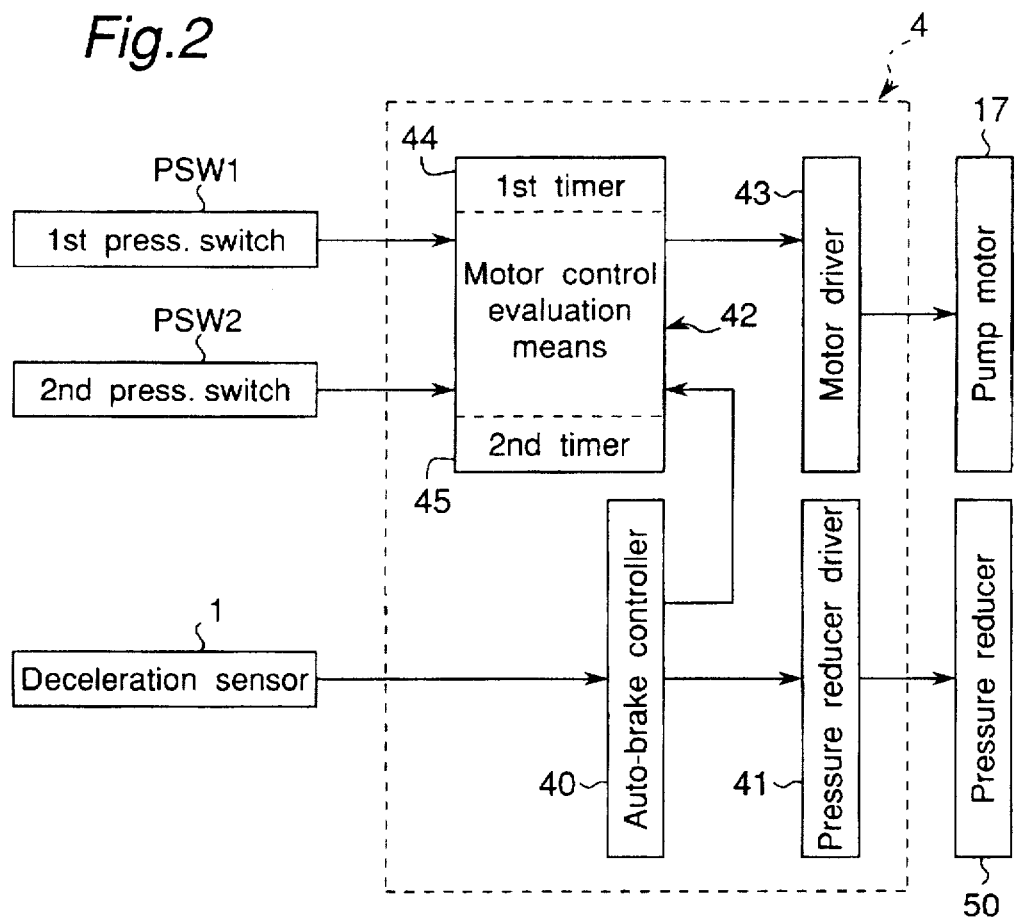
FIG. 2 is a block diagram of a control apparatus for an automotive fluid pressure circuit according to the first embodiment of the invention.

The preferred embodiment of a control apparatus for an automotive fluid pressure circuit according to the present invention is described below with reference to FIGS. 1 and 2. FIG. 1 is a system diagram of the control apparatus of the first embodiment adapted to a brake control system for a four wheel motor vehicle. FIG. 2 is a block diagram of a control apparatus for an automotive fluid pressure circuit according to the first embodiment of the invention.

As shown in FIG. 1, the control computer 4 is connected to a deceleration sensor 1 for detecting vehicle acceleration and deceleration, normally-closed IN-side solenoid valves 13a and 13b, and normally-open OUT-side solenoid valves 14a and 14b. Based on the signal data received from the deceleration sensor 1, the control computer 4 computes the brake fluid pressure control command value, which is the control signal for increasing, decreasing, or holding the brake fluid pressure, and uses the calculated value to drive the solenoid valves 13a, 13b, 14a, and 14b. Note that the front wheels 5 and rear wheels 6 are assumed to be as shown in FIG. 1.

The fluid pressure control valves 12a, 12b for controlling the brake fluid pressure are cylindrically shaped, and comprise a sheet member 25 containing a brake fluid input/output port on one open end of the cylinder, and an input/output port 26 on the other open end. Inside each of the control valve cylinders is a piston 27; a spring 28 disposed between the sheet member 25 and piston 27 to regulate piston movement; a fluid pressure control chamber 29 comprising the input/output port 26; and an input/output port 30 disposed on the sheet member 25 side of the cylinder perpendicularly to the operating axis of the piston 27. Note that the volume of the fluid pressure control chamber 29 is regulated by the movement of the piston 27.

The input/outputs port of the sheet member 25 of each of the fluid pressure control valves 12a, 12b is connected to the master cylinder 11. The front brake wheel cylinders 19 are mutually connected and connected to the input/output port 30 of the corresponding fluid pressure control valve 12a. Similarly, the rear brake wheel cylinders 20 are mutually connected and connected to the input/output port 30 of the corresponding fluid pressure control valve 12b.

One valve of the IN-side solenoid valve 13a is connected to one valve of the corresponding OUT-side solenoid valve 14a, and the input/output port 26 of the fluid pressure control chamber 29 in that fluid pressure control valve 12a is connected to the junction between solenoid valves 13a and 14a. Likewise, one valve of the other IN-side solenoid valve 13b is connected to one valve of the corresponding OUT-side solenoid valve 14b, and the input/output port 26 of the fluid pressure control chamber 29 in that fluid pressure control valve 12b is connected to the junction between solenoid valves 13b and 14b.

The other valves of OUT-side solenoid valves 14a and 14b are mutually connected and connected to the hydraulic unit reserve tank 18. The other valves of IN-side solenoid valves 13a and 13b are likewise mutually connected and connected to the accumulator 15. The accumulator 15 is connected through a check valve to a high pressure pump 16 driven by pump motor 17, and the high pressure pump 16 is connected through a check valve to the hydraulic unit reserve tank 18. The pump motor 17 is also connected to the control computer 4, which controls pump motor drive.

A first pressure switch PSW1 functioning as the first fluid pressure detection means of the claims, and a second pressure switch PSW2 functioning as the second fluid pressure detection means of the claims, are connected between the accumulator 15 and the high pressure pump 16. The first and second pressure switches PSW1 and PSW2 detect the fluid pressure of the accumulator 15, and can each indicate two states, high and low pressure states, relative to the respective fluid pressure settings. The first and second pressure switches PSW1 and PSW2 are also connected to the control computer 4, and output the respective detected pressure states to the control computer 4.

Note that the fluid pressure setting P1>fluid pressure setting P2 where P1 is the fluid pressure setting of the first pressure switch PSW1 and P2 is the fluid pressure setting of the second pressure switch PSW2.

When brake control is not applied in the above system, the IN-side solenoid valves 13a and 13b are closed, and the OUT-side solenoid valves 14a and 14b are open. The pressure in the fluid pressure control chambers 29 is therefore zero, and the pistons 27 are separated from the sheet member 25 by the force of the spring 28. As a result, the brake fluid pressure generated in the master cylinder 11 when the brake pedal 10 is operated is transferred directly to the front and rear brake wheel cylinders 19 and 20.

When brake control is applied, the control computer 4 excites the solenoids of the OUT-side solenoid valves 14a and 14b, thereby closing the valves, and excites the solenoids of the IN-side solenoid valves 13a and 13b as necessary to open those valves. The high pressure brake fluid stored in the accumulator 15 is therefore introduced to the fluid pressure control chambers 29 of the fluid pressure control valves 12a, 12b as required. This causes the pistons 27 to move in the direction of the sheet member 25, closing the input/output ports of each sheet member 25. As the pistons 27 continue to move toward the sheet members 25, the brake fluid between the piston 27 and the sheet member 25 is forced from input/output port 30 to the corresponding brake wheel cylinders, thereby increasing the brake fluid pressure of the front and rear brake wheel cylinders 19 and 20.

When the control computer 4 interrupts excitation of the solenoids in the IN-side solenoid valves 13a and 13b, the valves close, blocking further inflow and outflow of brake fluid to or from the brake wheel cylinders 19 and 20. The brake fluid pressure is thereby held steady.

When excitation of the solenoids in both the IN-side solenoid valves 13a and 13b and the OUT-side solenoid valves 14a and 14b is interrupted, the brake fluid in the fluid pressure control chambers 29 flows from the input/output ports 26 through the OUT-side solenoid valves 14a and 14b to the hydraulic unit reserve tank 18. The pistons 27 are also moved toward the input/output port 26 by the force of the spring 28, allowing the brake fluid stored in the corresponding brake wheel cylinders to flow from the input/output ports 30 between the pistons 27 and sheet members 25. The brake fluid pressure of the brake wheel cylinders thus drops, and as the pistons 27 move further, the input/output ports of the sheet members 25 open, thus restoring the system to the initial state.

The control computer 4 thus monitors the vehicle deceleration obtained from the deceleration sensor 1 and the calculated vehicle deceleration to precisely adjust the brake fluid pressure.

Note that when the brake pedal 10 is operated during brake control in the present embodiment, the input/output ports of the sheet members 25 are closed insofar as the brake fluid pressure of the master cylinder 11 does not exceed the brake fluid pressure of the brake wheel cylinders 19 and 20 controlled by the brake control system. Brake fluid therefore does not flow to the brake wheel cylinders 19 and 20 from the master cylinder 11, and the braking force does not change. However, when the brake fluid pressure in the master cylinder 11 exceeds the brake fluid pressure of the brake wheel cylinders 19 and 20 controlled by the brake control system, the sheet members 25 function as check valves allowing the brake fluid in the master cylinder 11 to flow to the brake wheel cylinders 19 and 20, thereby enabling greater pressure to be applied by the brake pedal 10.

The first embodiment of the control apparatus for a fluid pressure circuit in automobiles according to the present invention and used in the automotive brake control system shown in FIG. 1 is described below with reference to the block diagram in FIG. 2. Note that like parts are identified by like part numbers in FIGS. 1 and 2, and further description thereof is omitted below.

Note that the pressure reducer 50 for increasing, decreasing, or holding the brake fluid pressure and shown in FIG. 2 comprises the fluid pressure control valve and solenoid valve shown in FIG. 1 and other components, but is treated 10 below as a single apparatus for simplicity alone. Furthermore, the control computer 4 calculates the brake fluid pressure control command value, which is the control signal applied to the pressure reducer 50, based on the data received from the deceleration sensor 1 and the first and second pressure switches PSW1 and PSW2, and outputs this value to the pressure reducer 50. The control computer 4 also outputs the control signal to the pump motor 17 driving the high pressure pump 16.

Furthermore, the control computer 4 comprises, as shown in FIG. 2, an automatic brake controller 40, pressure reducer drive means 41, motor control evaluation means 42, and motor driver 43.

The automatic brake controller 40 calculates and outputs the braking request signal, which indicates the rate at which the brake fluid pressure is increased or decreased to apply the brakes automatically, from the vehicle deceleration; vehicle deceleration is calculated from the signal data received from the deceleration sensor 1. In response to the braking request signal from the automatic brake controller 40, the pressure reducer drive means 41 calculates the brake fluid pressure control command value, and drives the pressure reducer 50 using this command value. The motor control evaluation means 42 determines whether to turn the pump motor 17 ON or OFF based on the signal data from the first and second pressure switches PSW1 and PSW2 and the braking request signal from the automatic brake controller 40. The motor driver 43 then drives the pump motor 17 based on the evaluation signal output from the motor control evaluation means 42.

The motor control evaluation means 42 further comprises a first timer 44 for counting the time during which the first pressure switch PSW1 indicates a low pressure state, and a second timer 45 for counting the time during which the second pressure switch PSW2 indicates a low pressure state, and functions as the trouble evaluation means and the pump drive evaluation means of the claims.

In the control apparatus described above, the automatic brake controller 40 is connected to the deceleration sensor 1, pressure reducer drive means 41, and motor control evaluation means 42; calculates the braking request signal from the vehicle deceleration calculated from the deceleration sensor signal data; and outputs to the pressure reducer drive means 41 and the motor control evaluation means 42.

The pressure reducer drive means 41 is also connected to the pressure reducer 50, calculates the brake fluid pressure control command value based on the braking request signal input from the automatic brake controller 40, and outputs the calculated value to the pressure reducer 50. The brake fluid pressure is then controlled by the pressure reducer 50 to control the braking force of the vehicle. It is to be noted that the methods for calculating the acceleration/deceleration and the brake fluid pressure control command value are known in the literature, and further description thereof is therefore omitted below.

The motor control evaluation means 42 is connected to the first and second pressure switches PSW1 and PSW2 and the motor driver 43 to evaluate control of the pump motor 17 based on the signal data from the first and second pressure switches PSW1 and PSW2 and the braking request signal from the automatic brake controller 40, and outputs the result to the motor driver 43. The motor driver 43 is connected to the pump motor 17, and drives the pump motor 17 based on the evaluation signal input from the motor control evaluation means 42.

The implementation of motor drive control while detecting any problems or errors in the first and second pressure switches PSW1 and PSW2 and the pump motor 17 of the first embodiment of a control apparatus of the present invention as shown in FIG. 2 is described below with reference to the flow charts in FIGS. 3-7.

Figure 3:
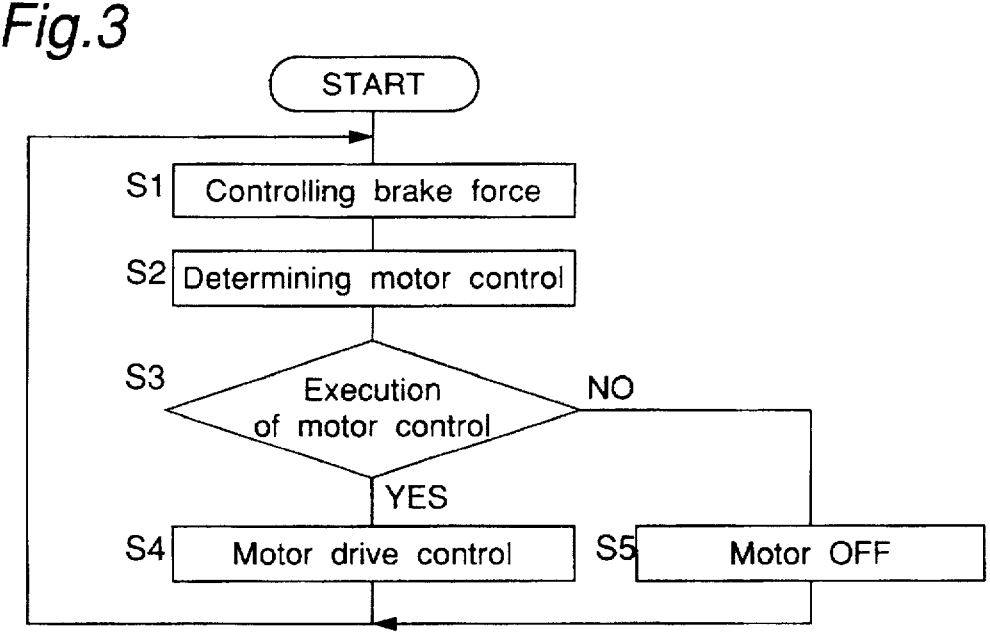
FIG. 3 is a flow chart used to describe the operation accomplishing drive control of the pump motor in a control apparatus according to the present invention shown in FIG. 2.

Referring first to FIG. 3, braking control is effected by the automatic brake controller 40, pressure reducer drive means 41, and pressure reducer 50 controlling the brake fluid pressure based on the signal data from the deceleration sensor 1 (step S1).

The motor control evaluation means 42 then determines whether to apply motor control (step S2). The subroutine executed for this motor control determination by the motor control evaluation means 42 is described below with reference to the flow charts in FIGS. 4-7. Note that unless otherwise specified, the process executed according to the flow charts in FIGS. 4-7 is executed by the motor control evaluation means 42.

Figure 4:
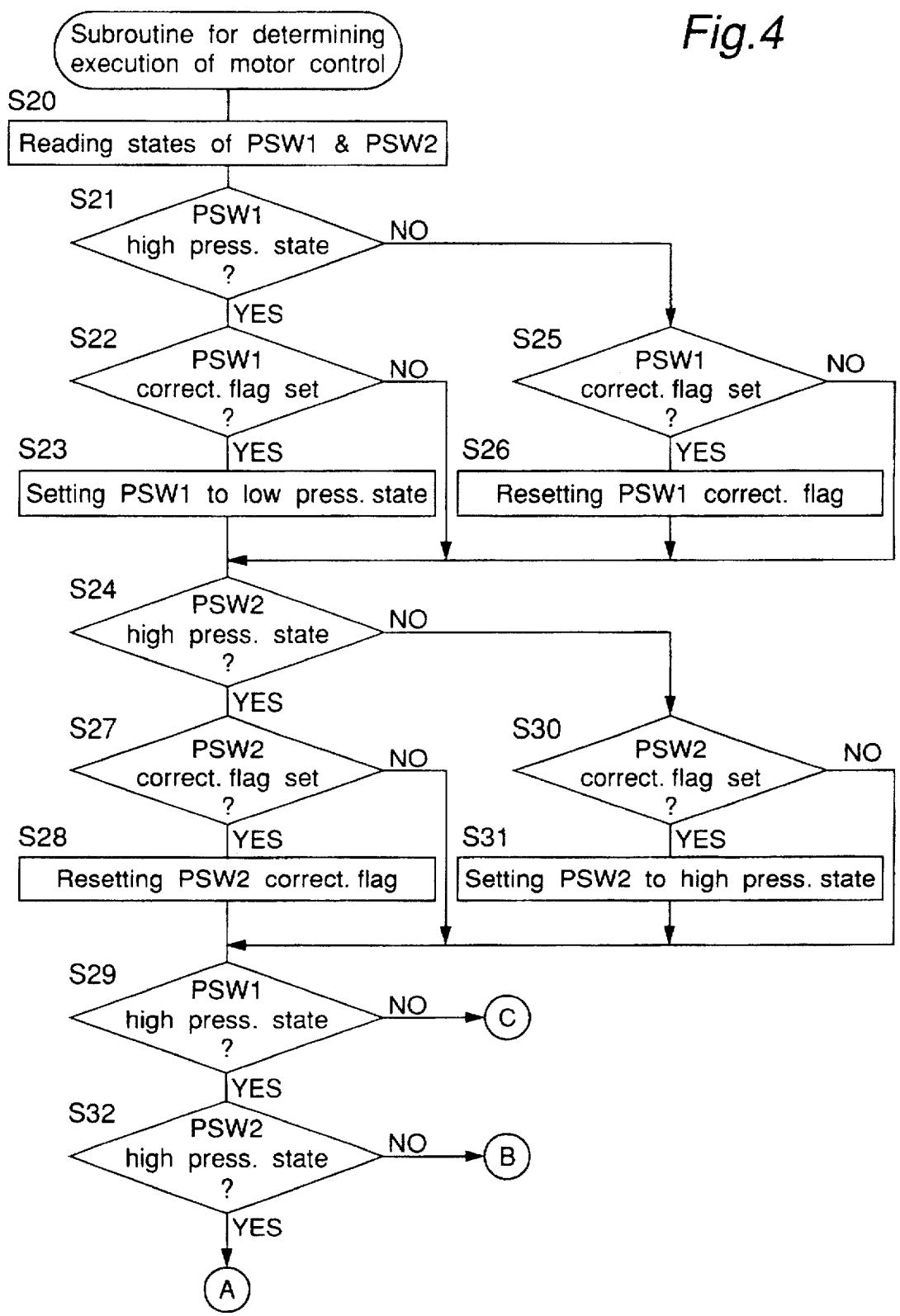
FIG. 4 is a flow chart used to describe the subroutine for determining whether to apply motor control in a control apparatus according to the present invention shown in FIG. 2.

Referring to FIG. 4, the motor control evaluation means 42 first reads the high or low pressure state of the first and second pressure switches PSW1 and PSW2 (step S20), and determines whether the first pressure switch PSW1 is in a high pressure state (step S21). If the first pressure switch PSW1 is set to the high pressure state (step S21 returns YES), it is determined at step S22 whether the PSW1 correction flag is set; the PSW1 correction flag is used to correct the first pressure switch PSW1 to a low pressure state.

If the PSW1 correction flag is set (step S22 returns YES), the pressure switch PSW1 is corrected so that the first pressure switch PSW1 indicates a low pressure state (step S23). It is then determined whether the second pressure switch PSW2 is set to a high pressure state (step S24).

If the first pressure switch PSW1 is not set to a high pressure state (step S21 returns NO), it is determined at step S25 whether the PSW1 correction flag is set. If it is (step S25=YES), the PSW1 correction flag is reset (step S26), and control flows back to step S24. If the PSW1 correction flag is not set at either step S22 or S25, a NO is returned and control also flows to step S24.

If the second pressure switch PSW2 is set to a high pressure state (step S24=YES), it is determined at step S27 whether the PSW2 correction flag is set; the PSW2 correction flag is used to correct the second pressure switch PSW2 to a high pressure state.

If the PSW2 correction flag is set (step S27 returns YES), the second pressure switch PSW2 is reset (step S28), and it is again determined whether the first pressure switch PSW1 is set to a high pressure state (step S29).

If the second pressure switch PSW2 is not set to a high pressure state (step S24 returns NO), it is determined at step S30 whether the PSW2 correction flag is set. If it is (step S30=YES), the brake fluid pressure is corrected so that the second pressure switch PSW2 indicates a high pressure state (step S31), and control flows back to step S29. If the PSW2 correction flag is not set at either step S27 or S30 (both return NO), control flows directly to step S29.

If the first pressure switch PSW1 is set to the high pressure state (step S29 returns YES), it is determined whether the second pressure switch PSW2 is set to a high pressure state after brake fluid pressure correction (step S32). If the second pressure switch PSW2 is set to a high pressure state (step S32 returns YES), control passes to step S33 of the subroutine shown in FIG. 5.

Figure 5:
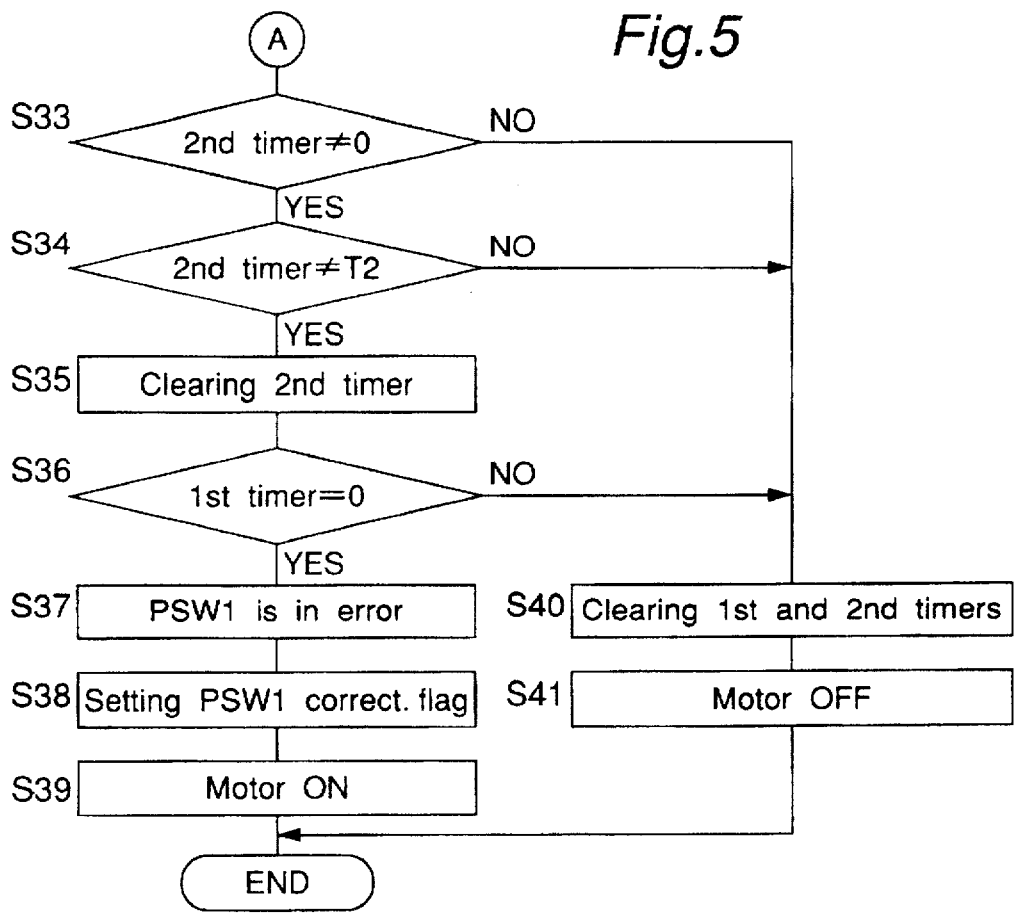
FIG. 5 is a flow chart used to describe the subroutine for determining whether to apply motor control in a control apparatus according to the present invention shown in FIG. 2.

It is then determined whether the value of the second timer 45 count is zero (0) (step S33, FIG. 5). If it is not zero (YES is returned), it is determined whether the time indicated by the count of the second timer 45 is equal to predetermined value T2 (step S34). If the count is not equal to T2 (step S34=YES), the counter of the second timer 45 is cleared (step S35).

It is then determined whether the value of the first timer 44 count is zero (0) (step S36). If it is zero (YES is returned), a problem is determined to exist in the first pressure switch PSW1 (step S37), the PSW1 correction flag is then set (step S38), the pump motor 17 is turned ON (step S39), and the control routine terminates.

If the value of the second timer 45 count is zero (0) (step S33=NO), control loops to step S40 and both the first timer 44 and second timer 45 are cleared to zero (0) (step S40). The pump motor 17 is then turned OFF (step S41) to stop the high pressure pump 16, and the control routine terminates.

Control also flows to step S40 if the time indicated by the count of the second timer 45 is equal to predetermined value T2 (step S34), and if the value of the first timer 44 count is not zero (0) (step S36). In these cases, steps S40 and S41 are executed, and the control routine terminates.

Figure 6:
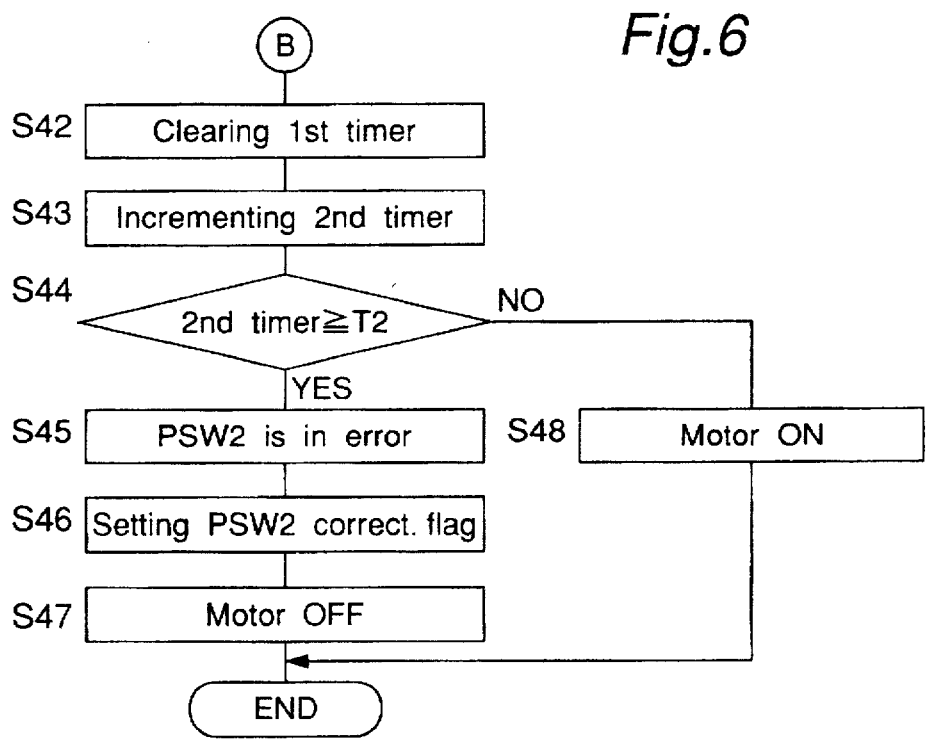
FIG. 6 is a flow chart used to describe the subroutine for determining whether to apply motor control in a control apparatus according to the present invention shown in FIG. 2.

Referring again to FIG. 4, control passes to step S42 of the flow chart shown in FIG. 6 if the second pressure switch PSW2 is not set to a high pressure state at step S32 (=NO).

The first timer 44 is then cleared to zero (0) (step S42, FIG. 6), the second timer 45 is incremented (step S43), and it is determined whether the time indicated by the count of the second timer 45 is greater than or equal to predetermined value T2 (step S44). If the time is greater than or equal to T2 (step S44=YES), a problem is determined to exist in the second pressure switch PSW2 (step S45). The PSW2 correction flag is then set (step S46), the pump motor 17 is turned OFF (step S47) to stop the high pressure pump 16, and the control routine terminates.

Figure 7:
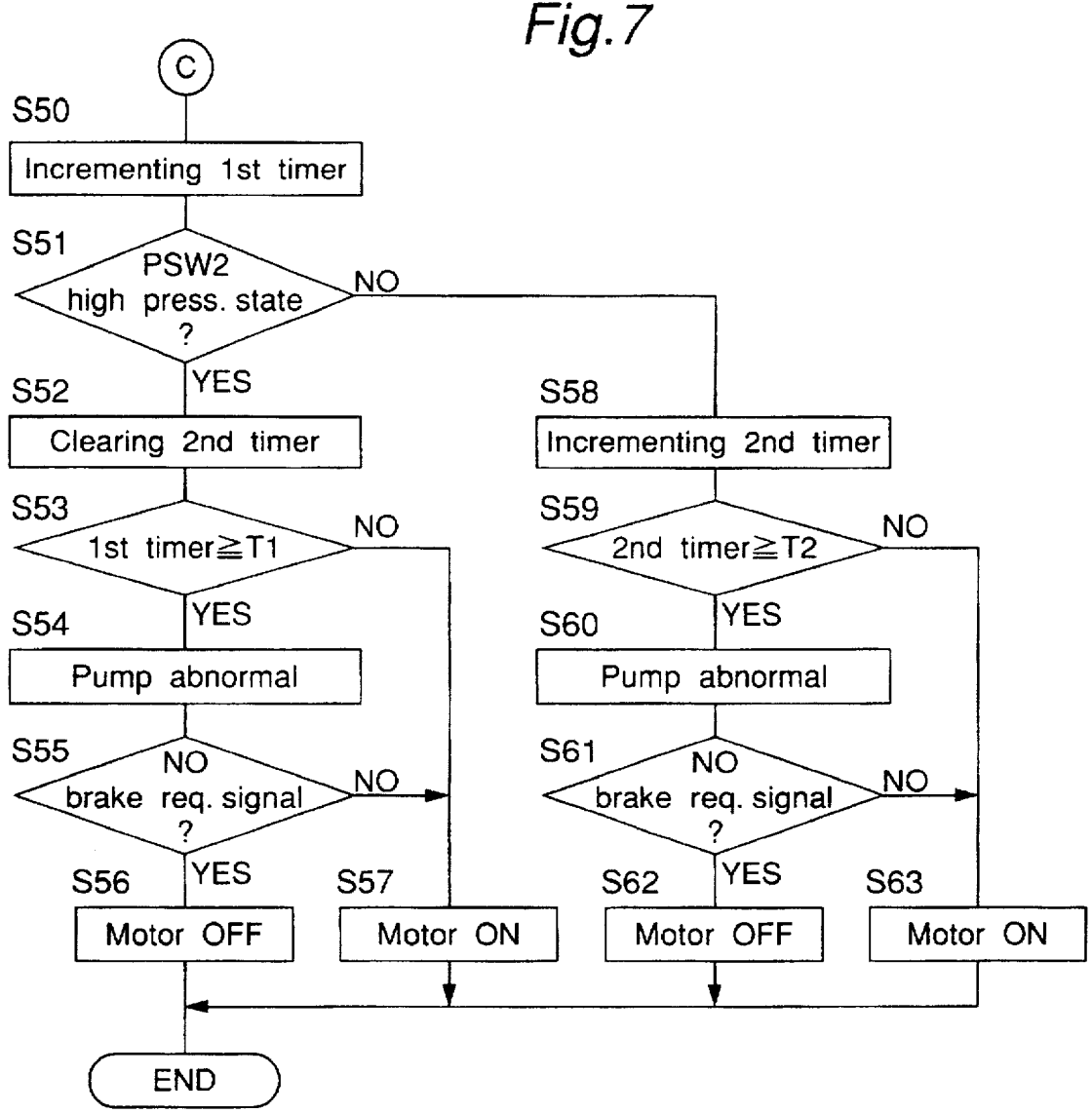
FIG. 7 is a flow chart used to describe the subroutine for determining whether to apply motor control in a control apparatus according to the present invention shown in FIG. 2.

Referring again to FIG. 4, control passes to step S50 of the flow chart shown in FIG. 7 if the first pressure switch PSW1 is not set to a high pressure state at step S29 (=NO).

The first timer 44 is then incremented (step S50, FIG. 7), and it is determined whether the second pressure switch PSW2 is set to a high pressure state after brake fluid pressure correction (step S51). If it is (step S51=YES), the second timer 45 is cleared to zero (step S52).

It is then determined whether the time indicated by the value of the first timer 44 is greater than or equal to a predetermined value T1 (step S53). If it is (step S53=YES), a problem is determined to have occurred in the pump motor 17 (including the high pressure pump 16) (step S54), and input of the braking request signal from the automatic brake controller 40 is then detected (step S55). If the braking request signal has not been input (step S55=YES), the pump motor 17 is turned OFF to stop the high pressure pump 16 (step S56), and the control routine terminates.

If the time indicated by the value of the first timer 44 is less than the predetermined value T1 (step S53=NO), or if the braking request signal has been input (step S55 =NO), control flows to step S57. The pump motor 17 is therefore turned ON to operate the high pressure pump 16 (step S57), and the control routine terminates.

If the second pressure switch PSW2 is not set to a high pressure state and step S51 therefore returns NO, the second timer 45 is incremented (step S58), and the value of the second timer 45 is then read (step S59). If the time indicated by the second timer 45 is greater than or equal to predetermined value T2 (step S59=YES), a problem is determined to have occurred in the pump motor 17 (including the high pressure pump 16) (step S60).

Input of the braking request signal from the automatic brake controller 40 is then detected (step S61). If the braking request signal has not been input (step S61=YES), the pump motor 17 is turned OFF to stop the high pressure pump 16 (step S62), and the control routine terminates.

If the time indicated by the value of the second timer 45 is not greater than or equal to T2 (step S59=NO), or if the braking request signal has been input (step S61 =NO), control flows to step S63. The pump motor 17 is therefore turned ON to operate the high pressure pump 16 (step S63), and the control routine terminates.

Referring again to the flow chart in FIG. 3, the motor driver 43 reads the evaluation result input from the motor control evaluation means 42 (step S3). If the result is a determination to turn the motor ON (step S3=YES), the pump motor 17 is driven at step S4, and the procedure loops back to step S1. If the determination is to turn the motor OFF (step S3=NO), the pump motor 17 is turned OFF (step S5), and the procedure loops back to step S1.

Embodiment 2

Figure 8:
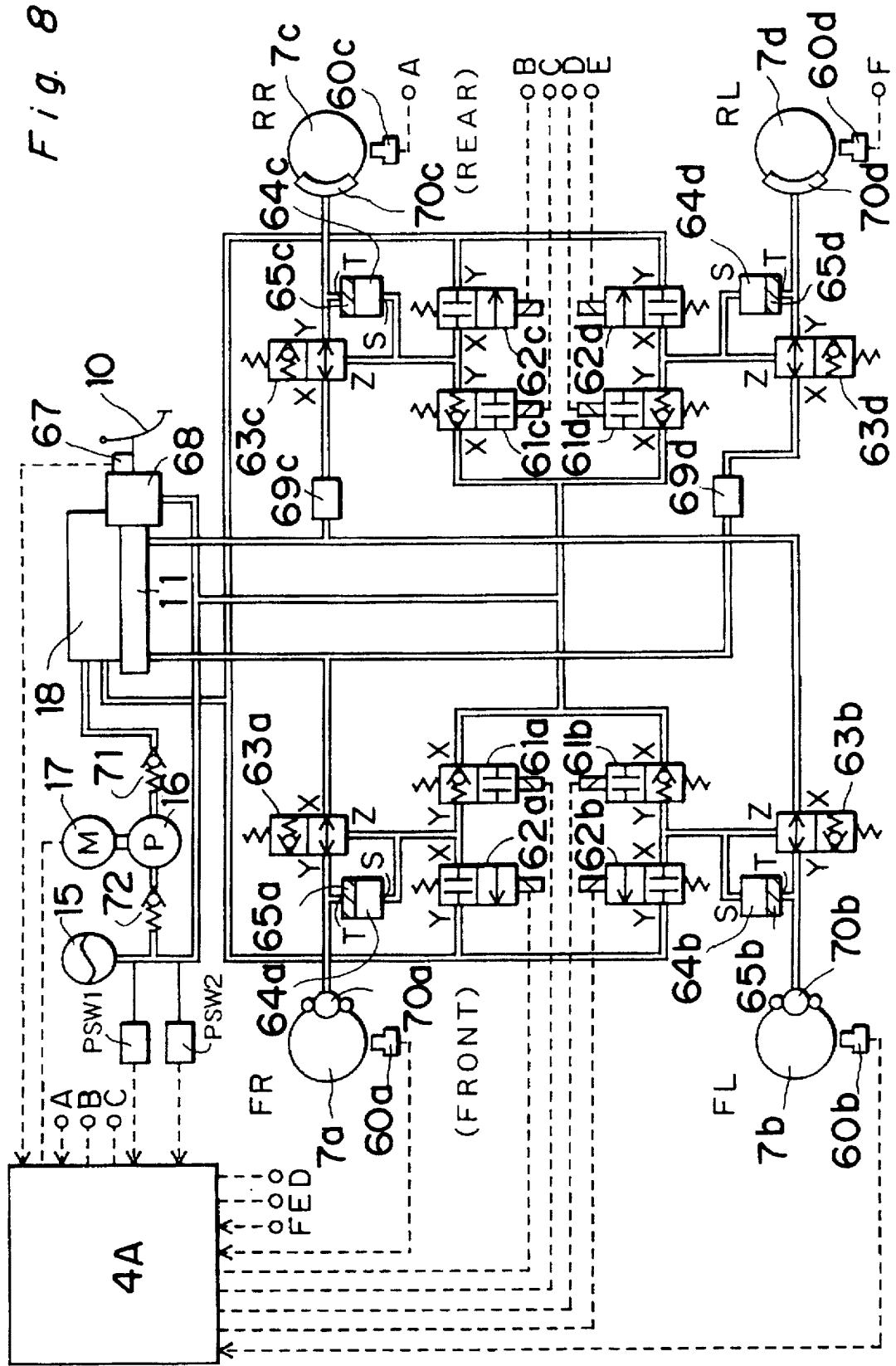
FIG. 8 is a system diagram of an expandable ABS apparatus in a four-wheel motor vehicle in which the control apparatus according to a second embodiment of the present invention is applied.
Figure 9:
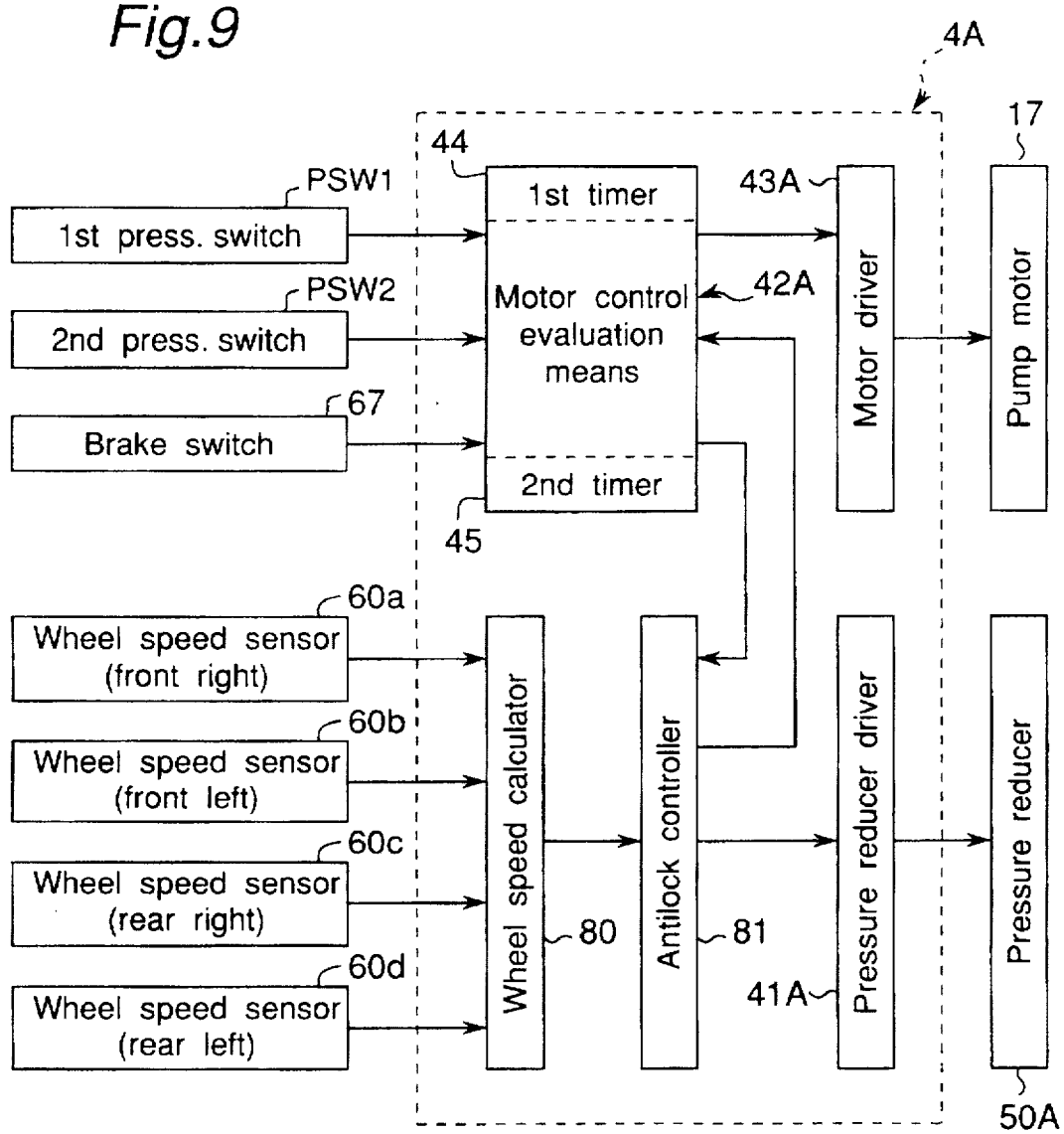
FIG. 9 is a block diagram of a control apparatus for a fluid pressure circuit in automobiles according to this second embodiment of the invention.

FIG. 8 is a system diagram of an expandable ABS apparatus using a booster in a four-wheel motor vehicle in which the control apparatus according to a second embodiment of the present invention is applied. FIG. 9 is a block diagram of a control apparatus for a fluid pressure circuit in automobiles according to this second embodiment of the invention. Note that like parts in FIGS. 8 and 9 of this second embodiment and FIGS. 1 and 2 of the first embodiment described above are identified by like reference numbers, and further description thereof is therefore omitted below. Furthermore, note that the indices a, b, c, and d in the following description reference the front right, front left, rear right, and rear left wheels, respectively, in the following description of the second embodiment, such that 7a and 7b are the front right and left wheels, respectively, and 7c and 7d are the rear right and left wheels, respectively, in FIG. 8.

As shown in FIG. 8, the control computer 4A is connected to wheel speed sensors 60a, 60b, 60c, and 60d, which are provided at each vehicle wheel to detect the respective wheel speed; inlet valves 61a, 61b, 61c, and 61d, which are solenoid valves, function as two-position directional control valves; the solenoids for the outlet valves 62a, 62b, 62c, and 62d; the pump motor 17 for driving the high pressure pump 16; and an ON/OFF brake switch 67 connected to the brake pedal 10 for detecting when the brake pedal 10 is operated.

During ABS control, the control computer 4A calculates the ABS control signal, which controls whether the brake fluid pressure is increased, decreased, or held steady, based on the respective wheel speeds calculated from the signal data supplied from the wheel speed sensors 60a–60d, and controls the operation of the inlet valves 61a–61d, outlet valves 62a–62d, and the pump motor 17. Note that a linear sensor whereby the output signal varies continuously according to the change in the stroke of the brake pedal may be used for the brake switch 67.

Each of the inlet valves 61a–61d and outlet valves 62a–62d has two ports X and Y. When current is not supplied to the solenoid, the inlet valves 61a–61d function as check valves and brake fluid flows from port X to port Y, and ports X and Y of the outlet valves 62a–62d are closed. When current is supplied to the solenoid, ports X and Y of the inlet valves 61a–61d are closed, and ports X and Y of the outlet valves 62a–62d are open.

Ports X of the inlet valves 61a–61d are connected to a common circuit that is in turn connected to the accumulator 15. Ports Y of the outlet valves 62a–62d are similarly connected to a common circuit that is in turn connected to the hydraulic unit reserve tank 18. Ports Y of the inlet valves 61a–61d are also connected to ports X of the outlet valves 62a–62d. These junctions are further connected to port Z of the applied pressure diverters 63a–63d, which function as two-position directional control valves, and to port S of the fluid pressure control chambers 64a–64d. It is to be noted that applied pressure diverters 63a–63d switch position according to the fluid pressure applied to port Z.

Each of the applied pressure diverters 63a–63d also has two ports X and Y, each port Y being connected to the corresponding wheel cylinder 70a–70d. Port T of the fluid pressure control chambers 64a–64d is connected to the line between the corresponding wheel cylinder 70a–70d and port Y of the corresponding applied pressure diverters 63a–63d.

When fluid pressure from the accumulator 15 is not applied to ports Z of the applied pressure diverters 63a–63d, the applied pressure diverters 63a–63d function as check valves, and the brake fluid flows from ports Y to ports X. When pressure from the accumulator 15 is applied to ports Z, ports X and Y of the applied pressure diverters 63a–63d are through-connected, ports X of the front applied pressure diverters 63a and 63b are connected to the master cylinder 11, and ports X of the rear applied pressure diverters 63c and 63d are connected to the master cylinder 11 through the proportioning valves 69c and 69d; the proportioning valves 69c and 69d are for lowering the fluid pressure of the rear wheel cylinders 70c and 70d to below that of the front wheel cylinders 70a and 70b.

Each of the fluid pressure control chambers 64a–64d comprises an internal pressure reducing piston 65a–65d. Ports S and T are disposed at the opposite ends of the direction of the pressure reducing piston stroke such that the pressure reducing pistons 65a–65d move toward port T when the fluid pressure from the accumulator 15 is applied from port S, and move back toward port S when the pressure from port S is relieved.

The hydraulic unit reserve tank 18 is connected through the check valve 71 to the high pressure pump 16, which is connected through check valve 72 to the accumulator 15. Note that the one check valve 71 allows the brake fluid to flow only from the hydraulic unit reserve tank 18 to the high pressure pump 16, and the other check valve 72 allows the brake fluid to flow only from the high pressure pump 16 to the accumulator 15. The first pressure switch PSW1, which functions as the first fluid pressure detection means of the claims, and the second pressure switch PSW2, which functions as the second fluid pressure detection means of the claims, are connected to the line between the one check valve 72 and the accumulator 15.

The first and second pressure switches PSW1 and PSW2 detect the fluid pressure of the accumulator 15, and can each indicate two states, high and low pressure states, relative to the respective fluid pressure settings. The first and second pressure switches PSW1 and PSW2 are also connected to the control computer 4A, and output the respective detected pressure states to the control computer 4A.

By means of this construction, the brake fluid pressure stored in the accumulator 15, which is the high brake fluid pressure source, is supplied to the booster 68 when the brake pedal 10 is pressed. The applied brake pressure pushes the piston (not shown in the figures) inside the master cylinder 11, thus pressurizing the brake fluid supplied from the hydraulic unit reserve tank 18 and applying the brake fluid pressure to ports X of the applied pressure diverters 63a–63d. When the brake pedal 10 is released, the fluid pressure from the booster 68 is applied to the hydraulic unit reserve tank 18, and the fluid pressure acting on the piston inside the master cylinder 11 drops. The master cylinder piston is thus returned, lowering the fluid pressure inside the master cylinder 11, and thereby lowering the pressure applied to ports X of the applied pressure diverters 63a–63d.

When ABS control is not active, current is not supplied to the solenoids of the inlet valves 61a–61d and outlet valves 62a–62d. The fluid pressure from the accumulator 15 is thus passed through the inlet valves 61a–61d from ports S into the fluid pressure control chambers 64a–64d, pushing the pressure reducing pistons 65a–65d to the port T side. The same fluid pressure is also supplied to ports Z of the applied pressure diverters 63a–63d, which thereby switch to connect ports X and Y and apply the brake fluid pressure from the master cylinder 11 to the wheel cylinders 70a–70d.

When the brake fluid pressure at each wheel is reduced during ABS control, the control computer 4A supplies current to the solenoids of the inlet valves 61a–61d and the outlet valves 62a–62d, thereby causing both valve sets to switch. The inlet valves 61a–61d are thus cut off by the fluid pressure from the accumulator 15, and the brake fluid in the fluid pressure control chambers 64a–64d flows from ports S through the outlet valves 62a–62d and into the hydraulic unit reserve tank 18.

When the fluid pressure inside the fluid pressure control chambers 64a–64d drops, the applied pressure diverters 63a–63d switch and function as check valves, shutting off the flow of brake fluid from the master cylinder 11 to the wheel cylinders 70a–70d. The pressure reducing pistons 65a–65d thus also move to the port S side, allowing the brake fluid in the wheel cylinders 70a–70d to flow into the fluid pressure control chambers 64a–64d, reducing the brake fluid pressure in the wheel cylinders 70a–70d, and reducing the brake pressure acting on each of the wheel brakes.

When the brake pressure at each wheel is to be held constant, the control computer 4A supplies current to the solenoids of the inlet valves 61a–61d, which thus assume the energized state (ports X and Y are closed), and interrupts the current supply to the outlet valves 62a–62d, which thus assume the non-energized state (ports X and Y are closed). This stops the flow of brake fluid through the fluid pressure control chambers 64a–64d, and thus holds the brake fluid pressure at each wheel cylinder 70a–70d constant.

The control apparatus for a motor vehicle fluid pressure circuit according to the second embodiment of the present invention is described below with reference to the block diagram shown in FIG. 9. It is assumed below that this control apparatus is used in an ABS system as shown in FIG. 8.

Referring to FIG. 9, the pressure reducer 50A for increasing, decreasing, or holding the brake fluid pressure and shown in FIG. 2 comprises the inlet valves 61a–61d, outlet valves 62a–62d, applied pressure diverters 63a–63d, and fluid pressure control chambers 64a–64d shown in FIG. 8, but is treated below as a single apparatus for simplicity alone. Furthermore, the control computer 4A calculates the brake fluid pressure control command value, which is the control signal applied to the pressure reducer 50A, based on the data received from the wheel speed sensors 60a–60d, the brake switch 67, and the first and second pressure switches PSW1 and PSW2, and outputs this value to the pressure reducer 50A. The control computer 4A also outputs the control signal to the pump motor 17 driving the high pressure pump 16.

Furthermore, the control computer 4A comprises, as shown in FIG. 9, a wheel speed calculator 80, antilock controller 81, pressure reducer drive means 41A, motor control evaluation means 42A, and motor driver 43A.

The wheel speed calculator 80 calculates the speed of each wheel based on the signal data received from the wheel speed sensors 60a–60d. The antilock controller 81 determines whether ABS control is required based on the wheel speeds calculated by the wheel speed calculator 80, and outputs the appropriate ABS control request signal when ABS control is required. The pressure reducer drive means 41A calculates the brake fluid pressure control command value in response to the ABS control request signal from the antilock controller 81, and drives the pressure reducer 50A using this command value. The motor control evaluation means 42A determines whether the pump motor 17 should be ON or OFF based on the ABS control request signal from the antilock controller 81 and the signal data from the brake switch 67 and the first and second pressure switches PSW1 and PSW2. The motor driver 43A then drives the pump motor 17 based on the evaluation signal output from the motor control evaluation means 42A.

The motor control evaluation means 42A further comprises a first timer 44 for counting the time during which the first pressure switch PSW1 indicates a low pressure state, and a second timer 45 for counting the time during which the second pressure switch PSW2 indicates a low pressure state, and functions as the trouble evaluation means and the pump drive evaluation means of the claims.

Connected to the wheel speed sensors 60a–60d and the antilock controller 81, the wheel speed calculator 80 calculates the speed of each wheel based on the signal data from the wheel speed sensors 60a–60d, and outputs the result to the antilock controller 81. The antilock controller 81 is connected to the pressure reducer drive means 41A and the motor control evaluation means 42A, and outputs the ABS control request signal to the pressure reducer drive means 41A and motor control evaluation means 42A when it is determined to apply ABS control based on each of the wheel speeds calculated by the wheel speed calculator 80.

The pressure reducer drive means 41A is further connected to the pressure reducer 50A, computes the brake fluid pressure control command value according to the ABS control request signal input from the antilock controller 81, and outputs the command value to the pressure reducer 50A. The brake fluid pressure is thus controlled by the pressure reducer 50A to control the vehicle braking force. Note that the wheel speed, ABS control request signal, and brake fluid pressure control command value are calculated by methods known in the literature, and further description thereof is thus omitted below.

The motor control evaluation means 42A is further connected to the brake switch 67, the first and second pressure switches PSW1 and PSW2, and the motor driver 43A, determines whether pump motor control is required based on the ABS control request signal from the antilock controller 81 and the signal data from the brake switch 67 and the first and second pressure switches PSW1 and PSW2, and outputs the result to the motor driver 43A.

The motor driver 43A is further connected to the pump motor 17, and can thus control the pump motor 17 in response to the signal supplied from the motor control evaluation means 42A.

When ABS control is active as determined by the motor control evaluation means 42A and the pump motor 17 is stopped, the ABS control request signal output from the antilock controller 81 to the motor control evaluation means 42A causes the pump motor 17 to switch ON; when the second pressure switch PSW2 indicates a low pressure state, the motor control evaluation means 42A outputs a signal prohibiting ABS control to the antilock controller 81.

The process executed by the control apparatus of the second embodiment shown in FIG. 9 to control motor drive while monitoring problems in the first and second pressure switches PSW1 and PSW2 and the pump motor 17 is described below with reference to the flow chart in FIG. 10.

Figure 10:
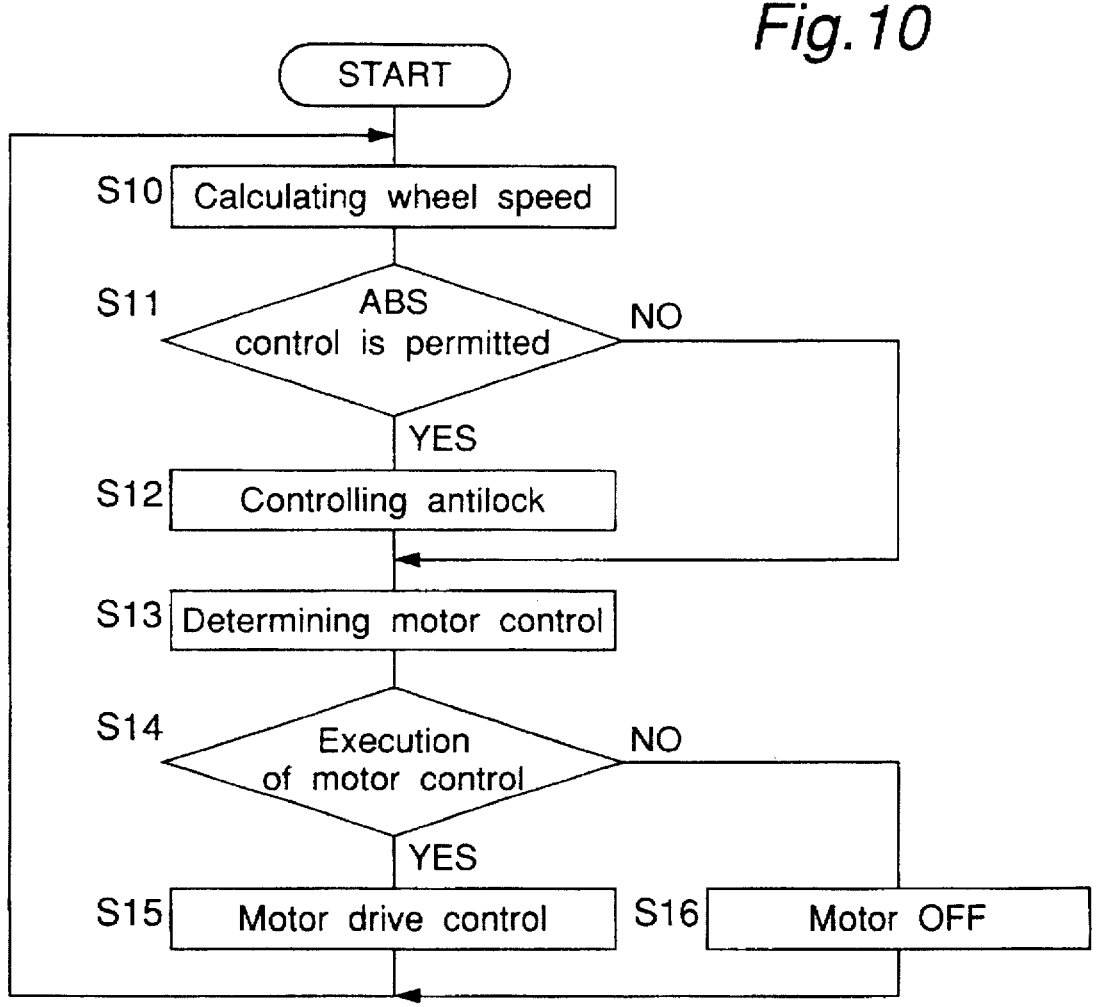
FIG. 10 is a flow chart used to describe the operation accomplishing drive control of the pump motor in a control apparatus according to the present invention shown in FIG. 9.

Referring to FIG. 10, the wheel speed calculator 80 first calculates the wheel speed of each wheel based on the signal data from the wheel speed sensors 60a–60d, and outputs the results to the antilock controller 81 (step S10). The antilock controller 81 then detects whether the signal prohibiting ABS control has been input from the motor control evaluation means 42A due to a low pressure state (step S11), i.e., determines whether ABS control is permitted by the motor control evaluation means 42A.

If ABS control is permitted (step S11=YES), antilock brake control is applied by the antilock controller 81, pressure reducer drive means 41A, and pressure reducer 50A based on the wheel speed data input from the wheel speed calculator 80 (step S12). If ABS control is not permitted (step S11=NO), control passes to step S13.

Figure 11:
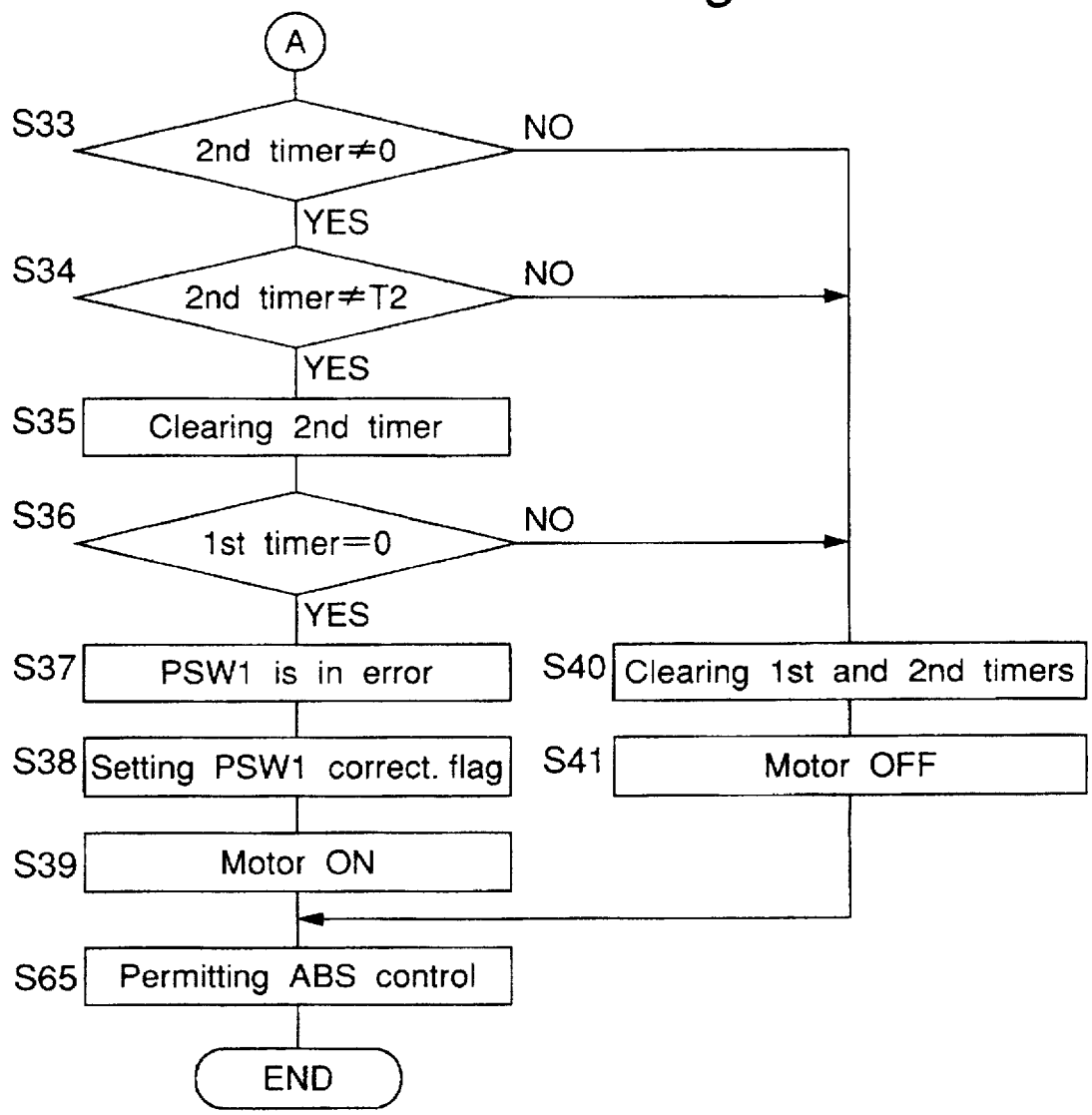
FIG. 11 is a flow chart used to describe the subroutine for determining whether to apply motor control in a control apparatus according to the present invention shown in FIG. 9.
Figure 12:
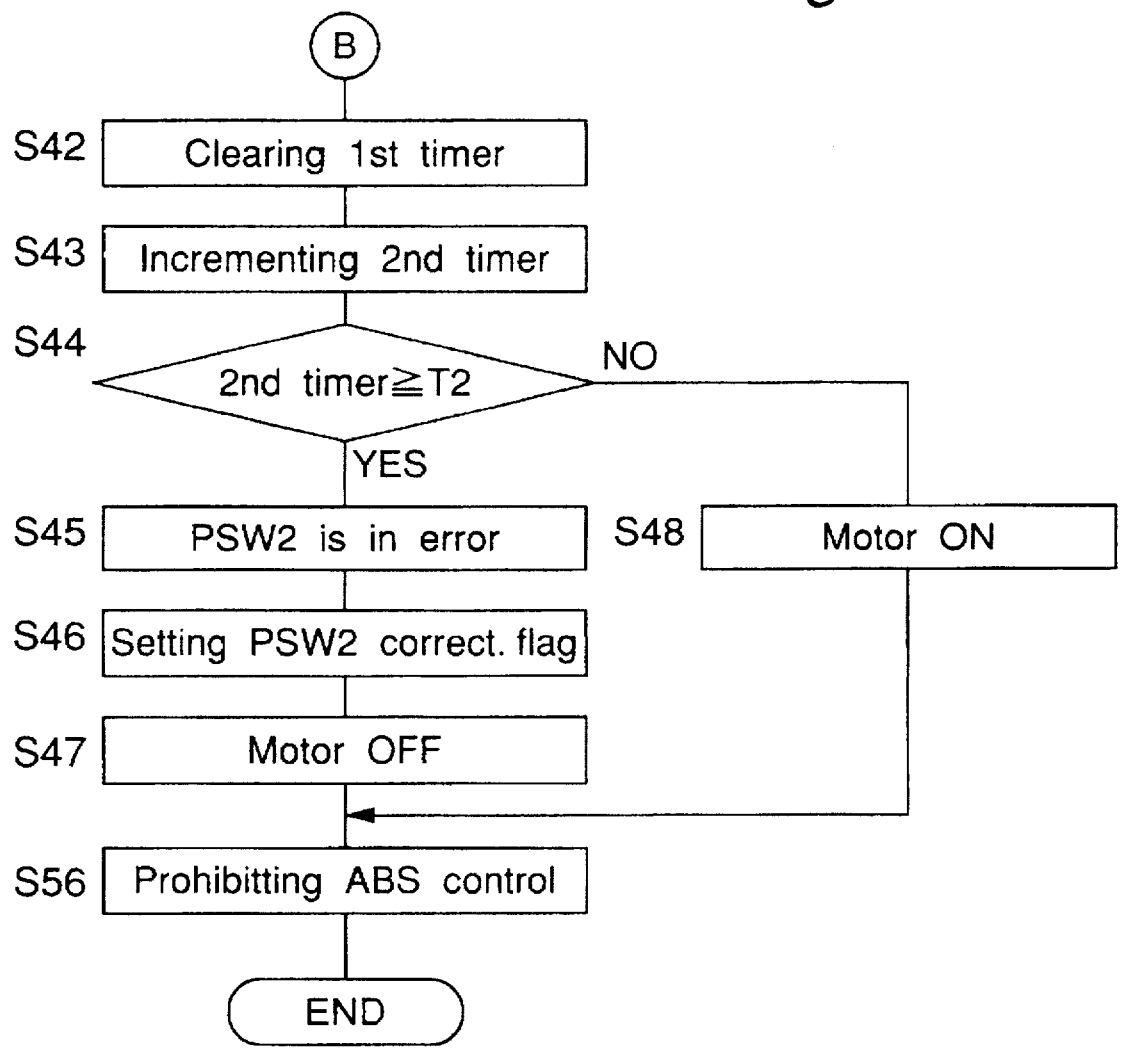
FIG. 12 is a flow chart used to describe the subroutine for determining whether to apply motor control in a control apparatus according to the present invention shown in FIG. 9.
Figure 13:
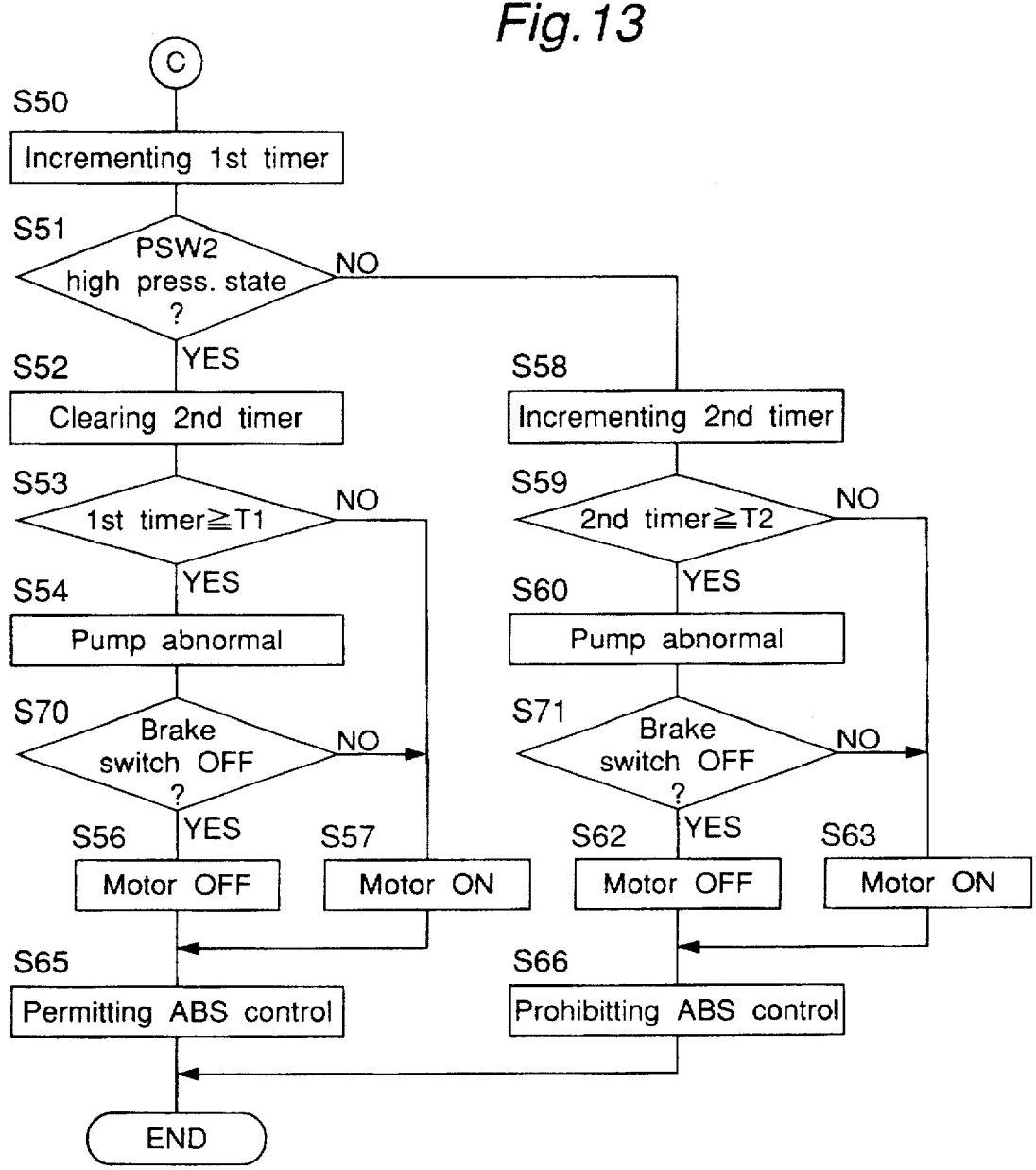
FIG. 13 is a flow chart used to describe the subroutine for determining whether to apply motor control in a control apparatus according to the present invention shown in FIG. 9.
Figure 14:
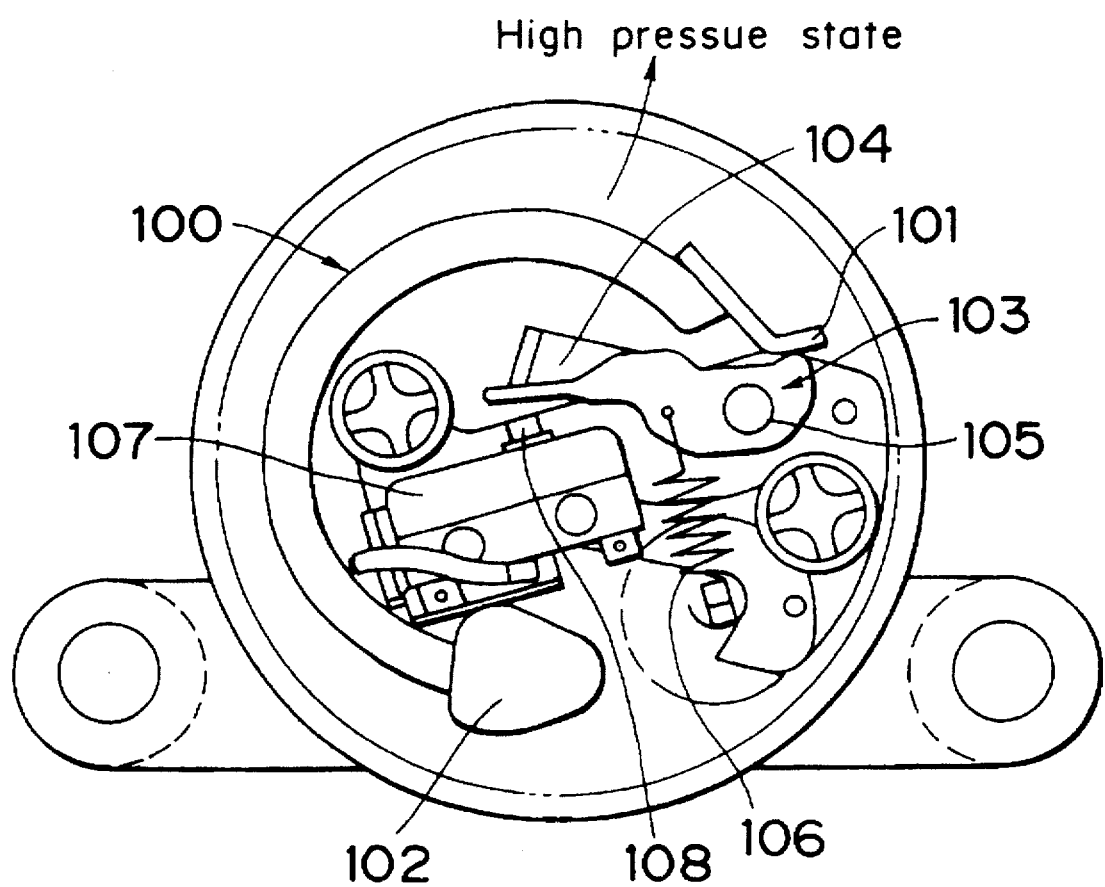
FIG. 14 shows an example of a pressure switch using a Bourdon tube.

Whether pump motor control is to be applied is then determined by the motor control evaluation means 42A (step S13). Note that the subroutine executed by the motor control evaluation means 42A to determine whether to apply pump motor control is similar to that executed by the motor control evaluation means 42 of the first embodiment and described above with reference to FIGS. 4–7. Note that here the motor control evaluation means 42A executes the procedure shown in the flow chart in FIG. 4, FIG. 11 is substituted for FIG. 5, FIG. 12 is substituted for FIG. 6, and FIG. 13 is substituted for FIG. 7. As the subroutine shown in FIG. 4 has already been described, the motor control evaluation routine of the second embodiment is described below with reference to FIGS. 11–13.

Note that in FIGS. 11–13 and FIGS. 5–7 the same steps are identified by identical reference numbers, and further description thereof is omitted below. Only the differences between the FIGS. 11–13 and FIGS. 5–7 are described below.

Note also that unless otherwise specified, the process executed according to the flow charts in FIGS. 11–13 is executed by the motor control evaluation means 42A.

The flow chart in FIG. 11 differs from that in FIG. 5 in that the processes in FIG. 5 executed by the motor control evaluation means 42 are executed by the motor control evaluation means 42A, and step S65 is added after steps S39 and S41 in FIG. 5.

After both steps S39 and S41 in FIG. 11, it is determined to permit ABS control (step S65), and the routine terminates without outputting the ABS control prohibit signal to the antilock controller 81.

The flow chart in FIG. 12 differs from that in FIG. 6 in that the processes in FIG. 6 executed by the motor control evaluation means 42 are executed by the motor control evaluation means 42A, and step S66 is added after steps S47 and S48 in FIG. 6.

After both steps S47 and S48 in FIG. 12, it is determined to prohibit ABS control (step S66), the ABS control prohibit signal is output to the antilock controller 81, and the routine terminates.

The flow chart in FIG. 13 differs from that in FIG. 7 in that the processes in FIG. 7 executed by the motor control evaluation means 42 are executed by the motor control evaluation means 42A, the evaluation process shown as step S55 in FIG. 7 is replaced by the evaluation process shown in step S70 in FIG. 13, the evaluation process shown as step S61 in FIG. 7 is replaced by the evaluation process shown in step S71 in FIG. 13, step S65 in FIG. 13 is added after steps S56 and S57 in FIG. 7, and step S66 in FIG. 13 is added after steps S62 and S63 in FIG. 7.

Referring to FIG. 13, after a problem is determined in the high pressure pump 16 (including the pump motor 17) (step S54), it is determined (step S70) whether the brake switch 67 is OFF, i.e., whether the brake pedal 10 is depressed, and whether the high pressure in the accumulator 15 is being consumed by the booster 68. If the brake switch 67 is OFF (step S70=YES), the pump motor 17 is turned OFF (step S56). If the brake switch 67 is ON (step S70=NO), the pump motor 17 is turned ON (step S57). After step S56 or S57 is executed, it is determined to permit ABS control (step S65), and the routine terminates without outputting the ABS control prohibit signal to the antilock controller 81.

Furthermore, after a problem is determined in the high pressure pump 16 (including the pump motor 17) (step S60), it is determined (step S71) whether the brake switch 67 is OFF, i.e., whether the brake pedal 10 is depressed, and whether the high pressure in the accumulator 15 is being consumed by the booster 68. If the brake switch 67 is OFF (step S71=YES), the pump motor 17 is turned OFF (step S62). If the brake switch 67 is ON (step S71=NO), the pump motor 17 is turned ON (step S63). After step S62 or S63 is executed, it is determined to prohibit ABS control (step S66), the ABS control prohibit signal is output to the antilock controller 81, and the routine terminates.

Referring again to FIG. 10, the motor driver 43A references the evaluation result input from the motor control evaluation means 42A (step S14). If the result is a determination to turn the motor ON (step S14=YES), the pump motor 17 is driven (step S15), and the procedure loops back to step S10. If the determination is to turn the motor OFF (step S14 =NO), the pump motor 17 is turned OFF (step S16), and the procedure loops back to step S10.

It is to be noted that in the first and second embodiments described above pressure switches indicating a high or low pressure state relative to the respective fluid pressure settings are used as the pressure detection means. It is also possible, however, to use linear sensors whereby the output signal varies continuously according to the change in the brake fluid pressure. Furthermore, ABS control is prohibited in the second embodiment above when the second pressure switch PSW2 indicates a low pressure state, but it is also possible to prohibit ABS control when a problem is detected in the high pressure pump 16 (including problems in the pump motor 17), or in the first or second pressure switches PSW1 and PSW2.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A control apparatus for an automotive fluid pressure circuit, said apparatus comprising:

first fluid pressure detection means for detecting a fluid pressure in an accumulator, and switching between two states when the detected fluid pressure reaches a first fluid pressure setting P1;

second fluid pressure detection means for detecting a fluid pressure in said accumulator, and switching between two states when the detected fluid pressure reaches a second fluid pressure setting P2 that is lower than the first fluid pressure setting P1;

a timer for counting a period during which the fluid pressure detected by said second fluid pressure detection means is less than the second fluid pressure setting P2; and trouble evaluation means for evaluating whether there is a problem in said first fluid pressure detection means or said second fluid pressure detection means, said trouble evaluation means comprising means for determining whether said first fluid pressure detection means and said second fluid pressure detection means are indicating different states, and means for determining when the period detected by said timer is equal to or greater than a predetermined value, whereby a problem in said first fluid pressure detection means or said second fluid pressure detection means is detected by said trouble evaluation means when said first fluid pressure detection means and said second fluid pressure detection means are determined to be indicating different states and the period detected by said timer is determined to be equal to or greater than said predetermined value, wherein said trouble evaluation means operates a pump to pressurize the fluid in said accumulator when the pressure detected by said first fluid pressure detection means substantially corresponds to a high pressure state that is greater than or equal to the first fluid pressure setting P1 and the pressure detected by said second fluid pressure detection means substantially corresponds to a low pressure state that is less than the second fluid pressure setting P2, said trouble evaluation means determining that a problem has developed in said second fluid pressure detection means when the period counted by said timer exceeds said predetermined value.

2. The control apparatus for an automotive fluid pressure circuit according to claim 1, wherein said trouble evaluation means determines said second fluid pressure detection means to be locked in a low pressure error state that is less than the second fluid pressure setting P2 when a problem is detected in said second fluid pressure detection means, said trouble evaluation means correcting said second fluid pressure detection means to a high pressure state in which the detected pressure is greater than or equal to the second fluid pressure setting P2.

3. The control apparatus for an automotive fluid pressure circuit according to claim 1, wherein said trouble evaluation means cancels an error determination for said second fluid pressure detection means when said second fluid pressure detection means indicates a high pressure state that is greater than or equal to the second fluid pressure setting P2 after a problem is detected in said second fluid pressure detection means.

4. A control apparatus for an automotive fluid pressure circuit, said apparatus comprising:

first fluid pressure detection means for detecting a fluid pressure in an accumulator, and switching between two states when the detected fluid pressure reaches a first fluid pressure setting P1;

second fluid pressure detection means for detecting a fluid pressure in said accumulator, and switching between two states when the detected fluid pressure reaches a second fluid pressure setting P2 that is lower than the first fluid pressure setting P1;

a timer for counting a period during which the fluid pressure detected by said second fluid pressure detection means is less than the second fluid pressure setting P2; and trouble evaluation means for evaluating whether there is a problem in said first fluid pressure detection means or said second fluid pressure detection means, said trouble evaluation means comprising means for determining whether said first fluid pressure detection means and said second fluid pressure detection means are indicating different states, and means for determining when the period detected by said timer is equal to or greater than a predetermined value, whereby a problem in said first fluid pressure detection means or said second fluid pressure detection means is detected by said trouble evaluation means when said first fluid pressure detection means and said second fluid pressure detection means are determined to be indicating different states and the period detected by said timer is determined to be equal to or greater than said predetermined value, wherein said trouble evaluation means operates a pump to pressurize the fluid in said accumulator when the pressure detected by said first fluid pressure detection means substantially corresponds to a high pressure state that is greater than or equal to the first fluid pressure setting P1 and the pressure detected by said second fluid pressure detection means substantially corresponds to a low pressure state that is less than the second fluid pressure setting P2, said trouble evaluation means determining that a problem has developed in said first fluid pressure detection means when the pressure detected by said second fluid pressure detection means becomes a high pressure state that is greater than or equal to the second fluid pressure setting P2 before said timer counts said predetermined value.

5. The control apparatus for an automotive fluid pressure circuit according to claim 4, wherein said trouble evaluation means determines said first fluid pressure detection means to be locked in a high pressure error state that is greater than or equal to the first fluid pressure setting P1 when a problem is detected in said first fluid pressure detection means, said trouble evaluation means correcting said first fluid pressure detection means to a low pressure state in which the detected pressure is less than the first fluid pressure setting P1.

6. The control apparatus for an automotive fluid pressure circuit according to claim 4, wherein said trouble evaluation means cancels an error determination for said first fluid pressure detection means when said first fluid pressure detection means indicates a low pressure state that is less than the first fluid pressure setting P1 after a problem is detected in said first fluid pressure detection means.

7. A control apparatus for an automotive fluid pressure circuit, said apparatus comprising:

first fluid pressure detection means for detecting a fluid pressure in an accumulator, and switching between two states when the detected fluid pressure reaches a first fluid pressure setting P1;

second fluid pressure detection means for detecting a fluid pressure in said accumulator, and switching between two states when the detected fluid pressure reaches a second fluid pressure setting P2 that is lower than the first fluid pressure setting P1;

a timer for counting a period during which the fluid pressure detected by said second fluid pressure detection means is less than the second fluid pressure setting P2; and trouble evaluation means for evaluating whether there is a problem in said first fluid pressure detection means or said second fluid pressure detection means, said trouble evaluation means comprising means for determining whether said first fluid pressure detection means and said second fluid pressure detection means are indicating different states, and means for determining when the period detected by said timer is equal to or greater than a predetermined value, whereby a problem in said first fluid pressure detection means or said second fluid pressure detection means is detected by said trouble evaluation means when said first fluid pressure detection means and said second fluid pressure detection means are determined to be indicating different states and the period detected by said timer is determined to be equal to or greater than said predetermined value.

8. The control apparatus for an automotive fluid pressure circuit according to claim 7, wherein said trouble evaluation means determines a problem to exist in a pump for pressurizing the fluid in said accumulator, and stops said pump, when said first fluid pressure detection means and said second fluid pressure detection-means indicate a detected fluid pressure that is less than the first fluid pressure setting P1 and the second fluid pressure setting P2, respectively, and the count for the period returned by said timer exceeds said predetermined value.

9. The control apparatus for an automotive fluid pressure circuit according to claim 8, wherein said trouble evaluation means drives said pump when the pressure detected by said first fluid pressure detection means substantially corresponds to a low pressure state that is less than the first fluid pressure setting P1 and the pressure detected by said second fluid pressure detection means substantially corresponds to a low pressure state that is less than the second fluid pressure setting P2, said trouble evaluation means determining that a problem exists in said pump and stops said pump when the period counted by said timer exceeds said predetermined value.

10. The control apparatus for an automotive fluid pressure circuit according to claim 1, said apparatus further comprising pump drive evaluation means for evaluating whether driving a pump to pressurize the fluid in said accumulator can be continued, based on a problem evaluation result returned by said trouble evaluation means, and means for driving said pump when it is determined by said pump drive evaluation means that driving of said pump is possible.

11. The control apparatus for an automotive fluid pressure circuit according to claim 10, said pump drive evaluation means canceling a pump stop command in response to an applied control signal instructing consumption of the fluid pressure in said accumulator when a pump problem is determined and said pump is stopped, and driving said pump for as long as the control signal is applied.

12. A control apparatus for an automotive fluid pressure circuit, said apparatus comprising:

a first fluid pressure detector which is adapted to detect a fluid pressure in an accumulator, and switch between two states when the detected fluid pressure reaches a first fluid pressure setting;

a second fluid pressure detector which is adapted to detect a fluid pressure in said accumulator, and switch between two states when the detected fluid pressure reaches a second fluid pressure setting that is lower than the first fluid pressure setting;

a timer for counting a period during which the fluid pressure detected by said second fluid pressure detector is less than the second fluid pressure setting; and a trouble evaluation system that evaluates whether there is a problem in said first fluid pressure detector or said second fluid pressure detector, said trouble evaluation system comprising a device that determines whether said first fluid pressure detector and said second fluid pressure detector are indicating different states, and a device that determines when the period detected by said timer is equal to or greater than a predetermined value, whereby a problem in said first fluid pressure detector or said second fluid pressure detector is detected by said trouble evaluation system when said first fluid pressure detector and said second fluid pressure detector are determined to be indicating different states and the period detected by said timer is determined to be equal to or greater than said predetermined value.

13. The control apparatus for an automotive fluid pressure circuit according to claim 12, wherein said trouble evaluation system operates a pump to pressurize the fluid in said accumulator when the pressure detected by said first fluid pressure detector substantially corresponds to a high pressure state that is greater than or equal to the first fluid pressure setting and the pressure detected by said second fluid pressure detector substantially corresponds to a low pressure state that is less than the second fluid pressure setting, said trouble evaluation system determining that a problem has developed in said second fluid pressure detector when the period counted by said timer exceeds said predetermined value.

14. The control apparatus for an automotive fluid pressure circuit according to claim 12, wherein said trouble evaluation system operates a pump to pressurize the fluid in said accumulator when the pressure detected by said first fluid pressure detector substantially corresponds to a high pressure state that is greater than or equal to the first fluid pressure setting and the pressure detected by said second fluid pressure detector substantially corresponds to a low pressure state that is less than the second fluid pressure setting, said trouble evaluation system determining that a problem has developed in said first fluid pressure detector when the pressure detected by said second fluid pressure detector becomes a high pressure state that is greater than or equal to the second fluid pressure setting before said timer counts said predetermined value.

15. The control apparatus for an automotive fluid pressure circuit according to claim 12, wherein said trouble evaluation system determines a problem to exist in a pump for pressurizing the fluid in said accumulator, and stops said pump, when said first fluid pressure detector and said second fluid pressure detector indicate a detected fluid pressure that is less than said first fluid pressure setting and said second fluid pressure setting, respectively, and the count for the period returned by said timer exceeds said predetermined value.

16. The control apparatus for an automotive fluid pressure circuit according to claim 15, wherein said trouble evaluation system drives said pump when the pressure detected by said first fluid pressure detector substantially corresponds to a low pressure state that is less than the first fluid pressure setting P1 and the pressure detected by said second fluid pressure detector substantially corresponds to a low pressure state that is less than the second fluid pressure setting P2, said trouble evaluation system determining that a problem exists in said pump and stops said pump when the period counted by said timer exceeds said predetermined value.

17. The control apparatus for an automotive fluid pressure circuit according to claim 12, said apparatus further comprising a pump drive evaluation system that evaluates whether driving a pump to pressurize the fluid in said accumulator can be continued based on a problem evaluation result returned by said trouble evaluation system, and a device for driving said pump when it is determined by said pump drive evaluation system that driving of said pump is possible.

18. The control apparatus for an automotive fluid pressure circuit according to claim 17, wherein said pump drive evaluation system cancels a pump stop command in response to an applied control signal instructing consumption of the fluid pressure in said accumulator when a pump problem is determined and said pump is stopped, and drives said pump for as long as the control signal is applied.

19. The control apparatus for an automotive fluid pressure circuit according to claim 12, wherein said first fluid pressure detector comprises a first pressure switch and said second fluid pressure detector comprises a second pressure switch, said first pressure switch and said second pressure switch being connected to said accumulator to detect the fluid pressure in said accumulator.

20. The control apparatus for an automotive fluid pressure circuit according to claim 19, wherein said first pressure switch and said second pressure switch are connected between said accumulator and a high pressure pump, said first pressure switch and said second pressure switch be adapted to switch between a high pressure state and a low pressure state relative to the respective fluid pressure settings of said first pressure switch and said second pressure switch.

* * * * *